(12) United States Patent
Jensen et al.

(10) Patent No.: US 7,645,387 B2
(45) Date of Patent: Jan. 12, 2010

(54) METHOD OF UTILIZING ION EXCHANGE RESIN AND REVERSE OSMOSIS TO REDUCE ENVIRONMENTAL DISCHARGES AND IMPROVE EFFLUENT QUALITY TO PERMIT RECYCLE OF AQUEOUS OR RADWASTE FLUID

(75) Inventors: Charles E. Jensen, Knoxville, TN (US); Dennis A. Brunsell, Knoxville, TN (US); Larry E. Beets, Knoxville, TN (US)

(73) Assignee: Diversified Technologies Services, Inc., Knoxville, TN (US)

( * ) Notice: Subject to any disclaimer, the term of this patent is extended or adjusted under 35 U.S.C. 154(b) by 296 days.

(21) Appl. No.: 11/636,847

(22) Filed: Dec. 11, 2006

(65) Prior Publication Data

US 2008/0135479 A1    Jun. 12, 2008

(51) Int. Cl.
*B01D 61/00* (2006.01)
*C02F 1/44* (2006.01)
*B01D 63/00* (2006.01)

(52) U.S. Cl. .................. 210/652; 210/649; 210/650; 210/638; 210/639

(58) Field of Classification Search .................. None
See application file for complete search history.

(56) References Cited

U.S. PATENT DOCUMENTS

| 3,528,901 A | 9/1970 | Wallace et al. |
| 3,795,609 A | 3/1974 | Hill et al. |
| 4,073,683 A | 2/1978 | Van der Schoot |
| 4,156,645 A | 5/1979 | Bray |
| 4,176,057 A | 11/1979 | Wheatley |

(Continued)

FOREIGN PATENT DOCUMENTS

GB    1 445 799    8/1976

(Continued)

OTHER PUBLICATIONS

Zakrzewska-Trznadel, "Application of ceramic membranes for hazardous wastes processing: pilot plant experiments with radioactive solutions", Desalination 162 (2004) 191-199.

(Continued)

*Primary Examiner*—Krishnan S Menon
(74) *Attorney, Agent, or Firm*—Monroe Alex Brown, Patent Attorney

(57) ABSTRACT

Method of maximizing resin utilization and optimizing reverse osmosis performance to polish an aqueous or radwaste fluid. The method provides resin scavenging of targeted isotopes and exposes filter media and resin to a higher influent activity concentration to enable higher waste loading and longer life of resin while protecting downstream reverse osmosis system from high concentration of contaminants.

An aqueous waste feedstream is processed through steps of filtering, demineralizing, and reverse osmosis; and the feedstream is separated into permeate and reject streams for recycling and evaluation, respectively. The permeate stream is recycled in ways that permit it to return to a supply area for recycle reuse or discharge. One of the steps in the invention reduces concentration of undesirable constituents in the reject stream which may adversely affect waste classification for packaging, shipping and disposal and protect personnel from radiation exposure by reducing the overall dose rate of the processed reject stream and reverse osmosis system.

48 Claims, 11 Drawing Sheets

U.S. PATENT DOCUMENTS

| | | |
|---|---|---|
| 4,243,523 A | 1/1981 | Pelmulder |
| 4,289,617 A | 9/1981 | Davis |
| 4,395,338 A | 7/1983 | Rowton |
| 4,430,226 A | 2/1984 | Hegde et al. |
| 4,482,459 A | 11/1984 | Shiver |
| 4,495,067 A | 1/1985 | Klein et al. |
| 4,610,790 A | 9/1986 | Reti et al. |
| 4,655,928 A | 4/1987 | Milton et al. |
| 4,666,603 A | 5/1987 | Madsen et al. |
| 4,676,908 A | 6/1987 | Ciepiela et al. |
| 4,705,625 A | 11/1987 | Hart, Jr. |
| 4,758,347 A | 7/1988 | Henz et al. |
| 4,808,287 A | 2/1989 | Hark |
| 4,810,340 A | 3/1989 | Blytas et al. |
| 4,828,712 A | 5/1989 | Reynolds et al. |
| 4,836,934 A | 6/1989 | Homer |
| 5,082,618 A | 1/1992 | Dagard |
| 5,114,576 A | 5/1992 | Ditzler et al. |
| 5,501,798 A | 3/1996 | Al-Samadi et al. |
| 5,512,181 A | 4/1996 | Matchett |
| 5,585,531 A | 12/1996 | Barker et al. |
| 5,597,487 A | 1/1997 | Vogel et al. |
| 5,635,071 A | 6/1997 | Al-Samadi et al. |
| 5,651,894 A | 7/1997 | Boyce et al. |
| 5,783,084 A | 7/1998 | Suenkonis |
| 5,807,486 A | 9/1998 | Busch, Jr. |
| 5,833,846 A | 11/1998 | Tanabe et al. |
| 5,925,255 A | 7/1999 | Mukhopadhyay |
| 5,997,745 A | 12/1999 | Tonelli et al. |
| 6,001,246 A | 12/1999 | Suenkonis |
| 6,054,050 A | 4/2000 | Dyke |
| 6,056,878 A | 5/2000 | Tessier et al. |
| 6,110,375 A | 8/2000 | Bacchus et al. |
| 6,113,797 A | 9/2000 | Al-Samadi |
| 6,245,121 B1 | 6/2001 | Lamy et al. |
| 6,426,005 B1 | 7/2002 | Larsson |
| 6,461,514 B1 | 10/2002 | Al-Samadi |
| 6,482,325 B1 | 11/2002 | Corlett et al. |
| 6,537,456 B2 | 3/2003 | Mukhopadhyay |
| 6,607,668 B2 | 8/2003 | Rela |
| 6,635,177 B2 | 10/2003 | Oswald et al. |
| 6,709,599 B1 | 3/2004 | Rosenberger et al. |
| 6,733,636 B1 | 5/2004 | Heins |
| 6,863,822 B2 | 3/2005 | Pipes |
| 6,878,285 B2 | 4/2005 | Hughes |
| 6,905,604 B2 | 6/2005 | Taber |
| 6,908,546 B2 | 6/2005 | Smith |
| 7,067,057 B2 | 6/2006 | Rosenberger et al. |
| 7,077,962 B2 | 7/2006 | Pipes |
| 7,186,344 B2 | 3/2007 | Hughes |
| 2004/0149658 A1 | 8/2004 | Dukhin et al. |
| 2006/0278582 A1 | 12/2006 | Hildebrand et al. |
| 2007/0045189 A1 | 3/2007 | Lichtner et al. |

FOREIGN PATENT DOCUMENTS

| | | |
|---|---|---|
| GB | 2 048 113 | 12/1980 |
| GB | 2 145 709 | 4/1985 |
| GB | 2 249 307 | 5/1992 |
| JP | 05068974 | 3/1993 |
| JP | 11000662 | 1/1999 |
| WO | WO 2005/113120 | 12/2005 |

OTHER PUBLICATIONS

Li-Shiang Liang, "Continuous Electrodeionization Processes For Production Of Ultrapure Water", 2001 Semiconductor Pure Water and Chemicals Conference, ppp. 1-14, Internet Pub.

Mignani, "Innovative ultrafiltration for wastewater reuse", Desalination 124 (1999) 287-292.

Goncharuk, "Purification of Drainage Water from Dumps of Sold Household Wastes Using Calcium Oxide . . . ", Chemistry of Sustainable Development 13 (2005) 603-610.

Hernon, "Removal of Weakly-Ionized Species by EDI", Conference Paper, 1998, found as Internet Publication in 2007, Ionics, Inc.

Okazaki, "Water Recycling Using Sequential Membrane Treatment in the Electronics Industry", Desalination 131 (2000) 65-73, Internet Pub. Elsevier.

Wang, "A study of the electrodeionization process—high-purity water production with a RO/EDI system", Desalination 132 (2000) 349-352, Internet Pub. Elsevier.

METHOD OF UTILIZING ION EXCHANGE RESIN AND REVERSE OSMOSIS TO REDUCE ENVIRONMENTAL DISCHARGES AND IMPROVE EFFLUENT QUALITY TO PERMIT RECYCLE OF AQUEOUS OR RADWASTE FLUID

BACKGROUND OF THE INVENTION

1. Field of the Invention

The present invention relates to a Method, Process or System for more particularly polishing a radwaste feedstream or aqueous waste volume.

2. Background Information

The liquid radwaste (LRW) systems in commercial nuclear power plants and utilities have used conventional demineralization to provide discharge wastewater that attempts to meet both NRC and waste quality requirements for radioactive isotopes and RCRA elements or of a quality for recycle and reuse. The NRC (U.S. NUCLEAR REGULATORY COMMISSION) has particular interest in radioactive isotopes including Tritium and Strontium-90; and the RCRA (U.S. "Resource Conservation and Recovery Act") elements include Ag (metal), As (metalloid), Ba (metal), Cd (metal), Cr (metal), Hg (metal), Pb (metal), and Se (nonmetal). It is known in the technology that radioactive fluids such as nuclear reactor cooling fluids and others characteristically have, along with Boron, salts and nonradioactive constituents. As indicated below, it is an object of the present invention "to maximize boron control", accomplished in most instances within the scope of the invention by passage or reuse through the RO system; to meet discharge, recycle or reuse purposes. It is well understood in the technology that Boron is a neutron absorption agent which is consumed in controlling the nuclear reaction at a nuclear plant facility. Therefore, boron control and passage in the present invention is important to the nuclear reaction itself. Importantly, Boron passage is maximized utilizing the present invention while past technology decreased the passage of Boron. Salts and nonradioactive metals are passed on through the present invention as much as possible to reduce the volume of radwaste generated. In this regard the present invention is utilized as the sole release point for liquid effluents from a nuclear power plant. Liquids must be released as a license condition for the operation of the plant. B10 (B10) is consumed as a neutron absorption agent to control the nuclear reaction and is converted to B11 (B11). While prior technology teach retaining B11 the present invention's method functions to remove the B11 and assist revitalization of the neutron absorption capacity of the reactor coolant with the addition of fresh B10. This is an important distinction of the present invention in relation to past technology. Plants have attempted to stay below regulatory discharge requirements by using demineralizer (ion exchange) technology where the principal components and technology have included conventionally positioned demineralizing systems consisting of tanks, essential piping, pumps and valves. Liquid wastes generated in using such past conventional setups have required further cleanup or treatment before release or recycle. They have been collected and processed by either installed plant demineralizers or vendor-supplied, conventional demineralization systems which were not capable of effectively treating or processing radwaste liqiuids or fluids to quality grade water permitting discharge back to the outside environment.

More recently other factors beyond regulatory requirements have come into play. The potential contamination of rivers, lakes, bays and estuaries by plant discharges has resulted in increased nuclear insurance rates, and attention by industry peer review and audit groups; and public attention by various activist groups has motivated utilities to continually improve environmental performance, by reducing releases of the main or primary gamma activity contributors of cesium, cobalt and iodine far below regulatory level for liquid releases to the environment.

As discharge of gamma emitters was reduced, secondary isotopes such as tritium and iron, that were previously masked or difficult to detect, became highlighted. Iron isotopes 55 and 59 were not readily removed by filtration and ion exchange. Therefore, a need for a more effective removal processing before discharge became necessary.

Tritium isotopes were more readily detected but virtually impossible to separate from the process stream. Therefore, plants have been evaluating the possibility of recycle of liquid streams back to the plant for further use instead of being discharged with tritium to the environment.

Prior to this invention, mechanical filtration and ion exchange technology was marginally capable of meeting reduced gamma discharges, effective removal of secondary isotopes for discharge or production of the high quality water required for recycle to allow retention of tritium.

Also, prior to the present invention, thousands of pounds of Boron were being discharged each year to the environment.

Additionally, aspects of the prior art in dealing with RCRA ("Resource Conservation and Recovery Act") wastewaters and recycle applications containing regulated chemicals permitted only to be discharged in limited amounts, have been sorely wanting.

In recent decades various membrane separation processes have been developed and utilized in the field of potable water purification; and more recently in the treatment of various process and waste liquors. Some of the membrane processes are capable of removing both dissolved and particulate contaminants. The best known and most utilized membrane processes in the field of water and wastewater treatment are those utilizing pressure gradient as the process driving force. These processes include reverse osmosis, nanofitration, ultrafiltration and microfiltration.

Pressure driven membrane separation processes differ mainly in the pore size of their membranes, which makes a particular membrane effective for the removal of a specific range of impurities. Reverse osmosis is used to remove all ionic species and thus has the smallest membrane pore size.

Direct Osmosis is the spontaneous transport (diffusion) of solvent that takes place when two solutions of different concentrations are separated by a semipermeable membrane that allows the solvent (but not dissolved species) to pass through it. The solvent, usually water, flows through the membrane from the less concentrated into the more concentrated solution. The flow continues until the solutions on both sides of the membrane are at the same concentration or until the pressure exerted by the difference in height between the two solutions is sufficient to stop the flow. The pressure required to just stop the flow is termed osmotic pressure, at which point the two solutions are in equilibrium. As the concentration difference between the solutions on the two sides of the membrane increases, the osmotic pressure increases.

This direct osmosis process can be reversed. Pressure applied to the more concentrated solution will permit the solvent to flow through the semipermeable membrane into the less concentrated solution. The term reverse osmosis (RO) has substantially been reserved, under conventional standards, for separation of dissolved ions and small molecules that contaminate aqueous solutions. The pressure exerted to force the flow of water into the less concentrated solution must exceed the osmotic pressure of the feed solution.

In reverse osmosis (RO), pressure greater than the osmotic pressure (usually about 10-40 MPa) is applied to the concentrated solution to cause the solvent to flow from the concentrated side of a semipermeable membrane to the diluted side. In most applications of RO, when the dissolved solid concentration reaches about 1-5 wt %, the osmotic pressure becomes too high to sustain the process. RO has been found to typically remove 90-99.5% of total dissolved inorganic solids and 70-99% of dissolved organic solids.

In the Prior Art, RO is considered a well-developed technology with systems having been used in the past in many industrial settings for years; having been applied to separation, concentration of product streams and wastewater treatment. More specifically, the technology has been used for removal of radionuclides from low level liquid wastes such as waste streams at nuclear power plants. In recent years RO systems have been used to replace or augment existing ion exchange technology. RO systems in the nuclear industry are usually a part of an overall liquid waste treatment system.

Therefore, over many years, application of pressure driven membrane separation RO has been demonstrated in nuclear and non-nuclear wastewater applications. In such uses, RO was placed in a position in a system or process ahead of a polishing demineralization treatment, in a configuration referred to as RO-IX. In this configuration, the RO separated the raw process stream into two distinct streams: 1) the permeate (clean) and 2) the reject (dirty) stream. The clean stream, containing reduced concentrations of impurities after one or two passes, still often required polishing with downstream ion exchange media to meet quality requirements for either recycle or discharge. The reject stream, containing a high fraction of the raw stream constituents, was then subject to further processing, for example, drying to dried solids. In this configuration, 90% to 99% of the waste stream contaminants were rejected by the RO and the balance removed by the downstream IX polisher.

A number of deficiencies of this process configuration have been identified. When presented with a high concentration of contaminants in the raw waste stream, a higher than desirable concentration of contaminants pass through the membrane, often requiring multiple RO passes and extensive ion exchange polishing to produce an acceptable permeate, thus resulting in increased capital equipment and operating costs and increased consumption of ion exchange resin to polish the permeate. In some instances, the RO concentrated raw stream contaminants to near their solubility limits. The volume of the reject had to be increased to preclude precipitation on the membrane and their fouling. The need for these process conditions, to effect adequate cleanup, resulted in increased equipment and operating costs, larger equipment footprint and increased resin consumption and further processing of increased reject volumes.

A problem, however, was found to occur with respect to utilization of the reject stream, which generally represented 2-15% of the feed stream volume. It was found that it was required to deal with such a waste stream because it contained a number of undesirable elements. In non-nuclear applications these elements could often be discharged to sanitary sewers or even returned to the original body of water. However, in nuclear applications the reject contained radioactive isotopes that were required to be sent to special disposal facilities in a stabile form. Since water, or substantially aqueous volumes were not regarded as an acceptable form, the water had to either be solidified or evaporated to leave dry or dirt-like solids. Since these volumes were significant the cost was found to be high, and sometimes prohibitive.

Likewise, the reject stream suffered shortcomings from this processing configuration. The reject stream, generally representing 2-15% of the feed stream volume, contained 90% to 99% of the contaminants presented to the RO in the raw waste stream. Some constituents may have been near their solubility limits, and thus could not be reprocessed through the RO a second time. If the reject was returned to the plant, the high concentration of contaminants was undesirable. In the past, in the instance of radioactive waste, if the reject was further processed for disposal, the high concentration of contaminants might cause elevated radiation doses. In other instances, the high concentration of specific isotopes might cause an increase in waste classification from the desirable low Class A classification to Class B and C, resulting in more onerous packaging, shipping and disposal requirements. In some past instances, the concentration of certain radioactive constituents caused the classification to be greater than Class C (GTCC), which precluded disposal by any means.

Additionally, in instances where the reject volume was increased to preclude exceeding the solubility of raw waste stream constituents to prevent membrane fouling, the greater volume of reject resulted in increased secondary processing costs for such treatment processes as evaporation, drying or solidification. The increased reject volumes and secondary processing costs reduced the economic viability of the RO-IX process configuration.

In non-nuclear applications these concentrated reject constituents precluded normal discharge to sanitary sewers, or return to the original body of water.

If these existing permeate and reject stream problems could be solved, substantial operational and economical benefits would be realized, thus enhancing the value and utility of RO as a purifying method, including RO treatment of nuclear waste or process streams. Therefore, the teachings of the present invention were developed to overcome the problematic issues in the prior art regarding these aspects.

Accordingly, it is an object of the present invention to provide a permeate stream and a reject stream, so that the reject is recycled back to the front of a system of which it is a part of, or back to the plant source, so that the removal percentage of demineralizers employed in such a system is great enough to prevent excess buildup of most all isotopes and other fouling chemicals.

It is also an object of the invention, in preferred embodiments, to utilize a method and system in proximate location to the end of a demineralizer radwaste system to polish wastewater of the remaining isotopes and other dissolved and colloidal materials, when present.

It is a further object of the invention to maximize boron control. In most instances this is accomplished, within the scope of the invention, by passage or reuse through the RO system. This is done to meet discharge, recycle or reuse purposes. This is accomplished by raising or lowering the pH for the purpose of altering the characteristics of boric acid passage.

A further object exists in facilitating the periodic use of a chemical treatment system to precipitate the silica in the system, or capture the silica by selective ion exchange when required.

Further objects and advantages include utilizing the RWRO post IX polisher therein of the invention; the advantageous use of carbon filters and ion exchange resins as good removal media for TOC found in the feed water; the reduction of TOC fouling of RO membranes; the use of deep bed carbon filtration ahead of demineralizers to reduce fouling as compared to mechanical filters conventionally used ahead of RO systems; the reduction of TSS fouling of RO membranes; the reduction of dose rate on RO system and membranes; the reduction of activity returned to the plant or discharged to the environment; the maximization of resin utilization by exposing the resin to higher influent activity concentration and retaining resin until completely depleted; and the utilization of acid conditions by cation resin (i.e., hydrogen form cation resin before the RWRO) to reduce pH adjustment and improve BA passage.

Among the many advantages to RO performance and to rejecting back to a plant or facility with which it is associated; include, but are not limited to: the reduction of volume rejected and returned to the plant; the reduction in the waste classification of concentrates and/or resulting dried solids; the maximization of resin utilization by exposing resin to a higher influent activity concentration; the aspect of permitting ionic through prior to resin replacement; the prevention of the return to the plant, or environmental discharge, of difficult to remove isotopes; the facilitation of scavenging of targeted isotopes, such as antimony, in a smaller waste stream, then provided; and the decrease on osmotic load through the use of increased permeate flow.

It is a further object of the invention to more effectively and efficiently utilize, in preferred embodiments, mechanical filtration and ion exchange technology in meeting reduced gamma discharges, removal of secondary isotopes for discharge and production of high quality water required for recycle to allow retention of tritium.

It is a further object to provide effective boron recycle. A related object, in preferred embodiments pertains to capture, for reduction of discharges or beneficial recycle, of non-radioactive elements such as boron.

A further object exists in providing a system which has application in dealing with RCRA wastewaters and recycle of regulated chemicals that can be discharged only in limited quantities.

It is the object of the present invention to provide a methodology of applying RO and ion exchange (IX) in such a manner as to create more favorable operating conditions and performance of the RO and demineralizer (IX) by situating the demineralizer system ahead of the RO in a configuration referred to as IX-RO wherein the RO acts as a polisher to the demineralization system. In the IX-RO configuration, often 90% to 99% of the contaminants will be removed by the IX system in advance of the RO polisher. A secondary configuration provides demineralization of the reject stream to further strip undesirable species from the reject before recycling or processing of the reject stream. These configurations result in improved RO performance and improved permeate and reject stream quality and conditions.

Another object and advantage of the invention includes IX scavenging of raw waste stream constituents that, when concentrated in the RO, could precipitate and foul the RO membranes. Reduction of such agents permits controlling the reject flow rates to meet the hydraulic needs of the membranes instead of adjustment to control internal RO precipitation. This results in reduced reject flow rates and volumes that must be recycled or treated.

A further object and advantage is served by IX scavenging of raw waste stream constituents, resulting in reduced concentration of contaminants in the reject stream. This favorable condition reduces the inventory of contaminants recycled back to the plant or the process system itself. The lower concentration of reject contaminants permits reprocessing through the IX-RO system with reduced concern of precipitation.

Another object and advantage of the invention is set forth by IX scavenging of raw waste stream constituents, including reduction in the concentration of key isotopes that affect waste classification for waste packaging, shipping and burial. Reduction of these isotopes in the raw waste stream, results in sympathetic reduction in the reject stream subject to secondary processing for disposal.

A further object and advantage of the invention is served by IX scavenging of raw waste stream constituents, including radioactive isotopes, to reduce mechanical entrapment of isotopes in the RO membranes and equipment system.

Accordingly, the lower radioactive dose rates achieved reduce exposure to operating personnel. This also reduces the frequency of, or need for, cleaning RO membranes, which would normally be needed to address and lower accumulated substances causing radioactivity. This facilitates avoidance of exposure to personnel, which would otherwise be necessary for handling and packaging of expended membranes.

Further objects and advantages of the invention are served by IX scavenging of contaminants from the reject stream to reduced isotopic content, resulting in reduced dose buildup during secondary process of the reject stream. Particular isotopes; for example, cesium 137, cobalt 60, carbon 14, iron 55, and antimony 125, when present in elevated concentrations, may result in elevated waste classification imposed by the Nuclear Regulatory Commission and other governmental and regulatory bodies. This results in more onerous packaging, shipping and burial requirements. Scavenging, by IX and similar processes, for these and other select isotopes from the reject stream will enable maintenance of Class A classification, resulting in reduced handling and disposal costs.

Additional objects and advantages of the invention include IX scavenging of raw waste stream constituents, to reduce the concentration of contaminants presented to the RO. Lower RO influent contaminates results in reduced contaminant concentrations in the RO permeate. This reduces, or eliminates the need for additional RO passes to effect cleanup of the process stream; or, in turn, reduces or eliminates the need for post-RO IX polishing of the permeate for discharge or recycle.

Other objects and advantages of the invention are served by IX scavenging of raw waste stream constituents to reduce the concentration of contaminants presented to the RO. This results in contaminants being affixed or captured by the IX system. This is a more favorable and efficient waste form for handling, packaging and disposal.

An additional object of the invention, and advantage served, includes IX scavenging of raw waste stream constituents, where the RO acts as a polisher. This maximizes IX resin utilization by permitting IX beds to remain in service well beyond normal chemical depletion. Ionic leakage from partially or fully chemically depleted IX bed is either captured by downstream IX bed; or when passed to the RO, is rejected to the reject stream. This contribution to the reject stream, in this case, is sufficiently small, often 1%-2% of the influent stream contaminate total. This does not materially or adversely affect the quality and secondary processing of the reject stream.

A further object, and advantage, of the invention lies in maximizing resin utilization and consumption reduction wherein the IX beds are exposed to the maximum concentration of contaminants of the raw process stream. This results in a more complete utilization of the exchange capacity of the resin and a higher exchange equilibrium. All of these things result in higher waste loading and reduced resin consumption, compared to IX performance when positioned in the dilute contaminant stream of the RO permeate as was the case in the Prior Art.

Another object of the invention is to set forth IX positioning in advance of the RO to enhance boron passage through the RO membranes. This enhanced passage is affected by pH reduction as the process stream passes through hydrogen form cation resin or by addition of acids, such as sulfuric or hydrochloric, to the process stream. Passage of a greater fraction of the boron to the permeate permits recovery of boron in the permeate and reduces the concentration in the reject stream. This avoids RO operating limitations imposed by the potential for precipitation of boron; and also reduces the resulting dried waste volumes due to reduced boron content. In the alternative, when maximizing the concentration of BA in the reject stream or minimizing boric acid in the permeate; the pH can be increased by passing the process stream through a hydroxide form anion resin or by addition of a basic solution such as sodium hydroxide.

A further object includes setting forth a system where the IX position is placed in advance of the RO, in facilitating the periodic use of a chemical treatment system to precipitate silica in the IX system, or for capturing the silica by selective ion exchange when required or appropriate.

An additional object is to set forth a method and system where the IX position is placed in advance of the RO in facilitating improved TOC removal from carbon filters downstream. When employed such carbon filters have the primary purpose in filtration and TOC removal. The use of IX aids in removal of that fraction of TOC that successfully transits the carbon filter. This protects the downstream RO from TOC contamination (a primary membrane fouling mechanism).

Yet a further object of the invention includes presenting a system and process that provides the further advantage of utilizing the RWRO as a post IX polisher in the invention. Other related advantages, in this regard, include the advantageous use of carbon filters and ion exchange resins as removal media for TOC found in the feed water; the reduction of TOC fouling of RO membranes; the use of deep bed carbon filtration ahead of demineralizers to reduce fouling as compared to mechanical filters conventionally used ahead of RO systems; the reduction of TSS fouling of RO membranes; the reduction of dose rate on RO system and membranes; the reduction of activity returned to the plant or discharged to the environment; the maximization of resin utilization by exposing the resin to higher influent activity concentration and retaining resin until completely depleted; and the utilization of acid conditions when needed.

It will, therefore, be understood by those skilled in these technologies that substantial and distinguishable device, process and functional advantages are realized in the present invention over the prior art. It will also be appreciated that the efficiency, flexibility, adaptability of operation, diverse utility, and distinguishable functional applications of the present invention all serve as important bases for novelty of the invention, in the field of improved aqueous waste and radwaste treatment.

SUMMARY OF THE INVENTION

The foregoing and other objects of the invention can be achieved with the present invention's process, device and/or system. The invention includes a method and associated system for more particularly polishing an aqueous fluid or (AF) supplied to a system at a supply area. The method of the present invention includes steps of demineralizing the (AF); conveying the (AF) through a reverse osmosis unit or subassembly, and dividing the (AF) into a permeate volume and a reject volume, where the permeate volume has a lower isotopic, organic and mineral content, and the reject volume has an increased isotopic, organic and mineral content; recycling the reject volume; and conveying the permeate volume to an evaluation or appraisement area.

In another aspect, the invention includes a method of maximizing resin utilization, more particularly polishing an aqueous fluid or supplied to a system at a supply area and selectively scavenging for targeted isotopes; by permitting greater concentrations thereof and exposing media and resin to a higher influent activity concentration. This method includes or encompasses the steps of: filtering the (AF); demineralizing the AF); passing the (AF) through reverse osmosis; dividing the (AF) into a permeate volume and a reject volume, where the permeate volume has a lower isotopic, organic and mineral content and the reject volume has an increased isotopic, organic and mineral content and a substantially greater concentration of reject ions and contaminants in relation to the (AF) prior to the dividing step; recycling the reject volume to the supply area and filtering step; and conveying the permeate volume to an evaluation, appraisement or monitoring area.

In related aspects, the invention includes a method of maximizing resin utilization, more particularly polishing an aqueous fluid or (AF) supplied to a system at a supply area and selectively scavenging for targeted isotopes by permitting greater concentrations thereof and exposing filter media and resin to a higher influent activity concentration. This method includes or encompasses the steps of: filtering the (AF); demineralizing the (AF); passing the (AF) through reverse osmosis; dividing the (AF) into a permeate volume and a reject volume where the permeate volume has a lower isotopic, organic and mineral content and the reject volume has an increased isotopic, organic and mineral content compared to the permeate (and often a lower rejected ion concentration than in the raw feed stream prior to filtering (AF)); recycling the reject volume to the supply area and filtering step; and conveying the permeate volume to an evaluation, appraisement or monitoring area.

BRIEF DESCRIPTION OF THE DRAWINGS

The following drawings illustrate exemplary embodiments for carrying out the invention. Like reference numerals refer to like parts in different views or embodiments of the present invention in the drawings.

REFERENCE NUMERALS

Figure 1:
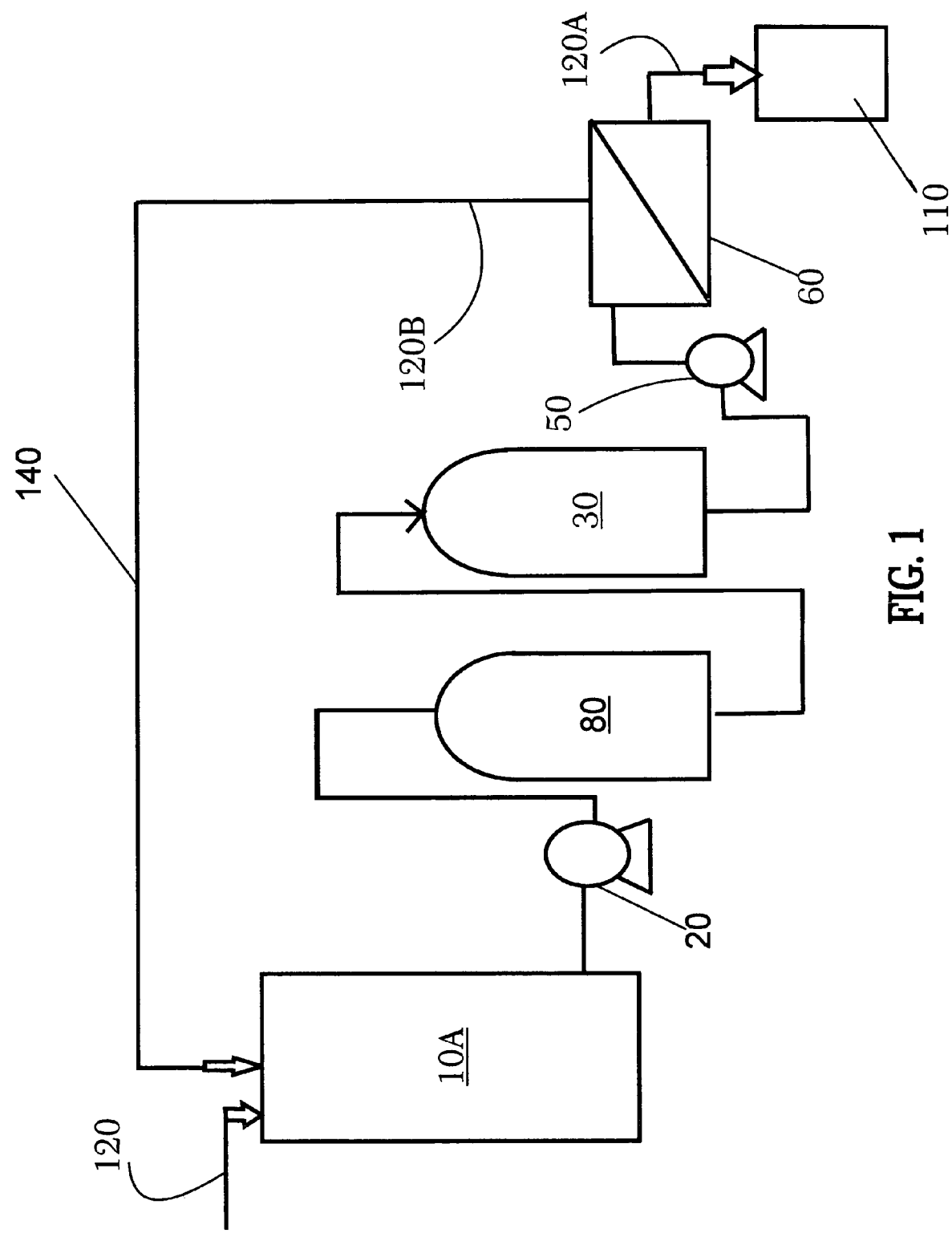
FIG. 1 is a flow chart of a method of treating an aqueous radioactive fluid in a radwaste system according to an exemplary embodiment of the invention.

10 RWRO System, the Method or the invention
10A Supply area or the step of supplying an AF (120) to a supply area
20 Conveyance subassembly or means or step
30 Demineralizer assembly or demineralizing step
30A Demineralizing step in a first area or location
30B Demineralizing step in a second or further area or location
40 Mechanical filtration or filter, or filtering step
50 Reverse osmosis conveyance unit or pump, or step
60 Reverse osmosis unit/subassembly or RO, or RO step or step of conveying AF to the RO
60A Dividing the AF (60) into a permeate volume 120A and a reject volume 120B (60A)
70 Reject demineralizer assembly or reject demineralizer step
80 Carbon filter, or carbon filter or filtering step
90 Chemical supply tank, or step of adding a chemical substance to the reject volume (120B) or adjusting the pH of the reject volume
100 Chemical supply conveyance or pump facilitating (90), or such means
110 Evaluation, appraisement or monitoring area or step
120 Aqueous Radioactive Fluid or (AF)or wastewater (Influent) from a nuclear reactor, a nuclear reactor radwaste system or nuclear reactor wastewater plant at a nuclear reactor site
120A Permeate volume or stream
120B Reject stream or volume
130 Further conveyance means or booster unit or pump, or step
140 The Step where a reject volume 120B is sent back as a recycle stream directly to the supply area 10A, carbon filtering step 80, filtering step 40, or demineralizing step 30A, without having a chemical adjustment
140A Recycling the reject volume 120B to the supply area 10A or the carbon filtering step 80, after pH adjustment or chemical treatment, and/or demineralization
150 Holdup area, and the step of conveying and enclosing the reject volume 120B therein

DETAILED DESCRIPTION OF THE PREFERRED EMBODIMENTS OF THE INVENTION

The following description of the preferred embodiments of the concepts and teachings of the present invention is made in reference to the accompanying drawing figures which constitute illustrated examples of the teachings, and structural and functional elements, of the present invention; among many other examples existing within the scope and spirit of the present invention.

Referring now to the drawings, FIGS. 1 through 11, thereof, there are illustrated, by schematic means, exemplary embodiments of the present invention addressing the method and system of maximizing boron control throughout the system, resin utilization within an ion exchange resin, more particularly polishing an aqueous liquid (AF, 120) containing radwaste or plant wastewater and selectively scavenging targeted isotopes and some other dissolved species; shown at 10, and referred to hereafter as the RWRO system, the Method or the invention. The present invention sets forth a unique method or process of utilizing ion exchange resin and reverse osmosis to reduce environmental discharges and improve water and effluent quality so as to permit recycle of aqueous radwaste fluid or liquid from a nuclear reactor, nuclear reactor radwaste system' or nuclear reactor wastewater plant served by the method's system, and provide improved quality water for separate environmental discharge and release.

The preferred exemplary embodiments of the invention include related variations of the following components or steps bringing such functions about: supply area 10A, conveyance subassembly or means 20, mechanical filtration or filter 40, demineralizer assembly 30, carbon filter 80, further conveyance means or booster unit or pump 130, reverse osmosis conveyance unit or pump 50, reverse osmosis unit/subassembly or RO 60, evaluation, appraisement or monitoring area 110, reject demineralizer assembly 70, chemical supply tank 90, and chemical supply conveyance or pump 100.

Each of the exemplary and preferred embodiments characterized and illustrated herein, respectively in FIGS. 1 through 11, indicate an initial starting step of supplying an (AF) 120 to a supply area 10A; and exemplary preferred embodiments of this step have been set forth herein. However, it is within the scope and spirit of the present invention that aqueous fluid 120 can be supplied for processing to the RWRO system 10 through other conveyance, storage and/or supply means.

As set forth in FIG. 1, the steps included as a preferred embodiment of the invention 10 comprise:
(1) Supplying an aqueous fluid or (AF) 120 to a supply area (10A);
(2) Carbon filtering the (AF) (80);
(3) Demineralizing the (AF) (30);
(4) Conveying the (AF) through a Reverse Osmosis unit RO (60), and dividing or separating the (AF) into a permeate volume 120A and a reject volume 120B (60A)
(5) Recycling the reject volume to the supply area or carbon filtering step, without chemical adjustment (140);

(6) Conveying the permeate volume to the evaluation, appraisement or monitoring area or step (110).

Figure 2:
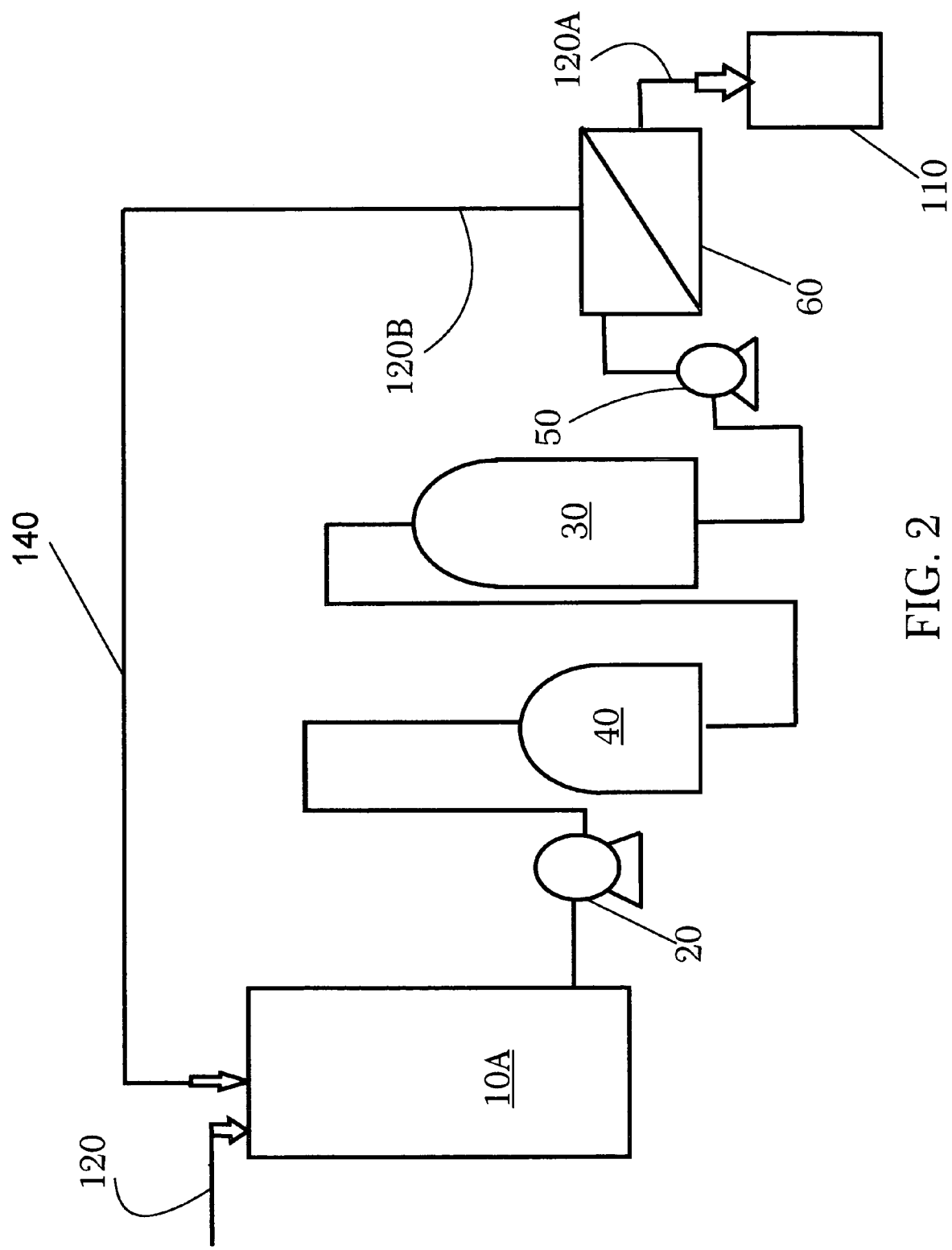
FIG. 2 is a flow chart of a method of treating an aqueous radioactive fluid in a radwaste system according to another exemplary embodiment of the invention.

As set forth in FIG. 2, the steps included as a preferred embodiment of the invention 10 comprise:
(1) Supplying an aqueous fluid or (AF) 120 to a supply area (10A);
(2) Filtering the (AF) (40);
(3) Demineralizing the (AF) (30);
(4) Conveying the (AF) through an RO (60), and dividing or separating the (AF) into a permeate volume 120A and a reject volume 120B (60A);
(5) Recycling the reject volume as a recycle stream, without chemical adjustment, to the supply area 10A or filtering step 40 (140);
(6) Conveying the permeate volume to the evaluation area (110).

Figure 3:
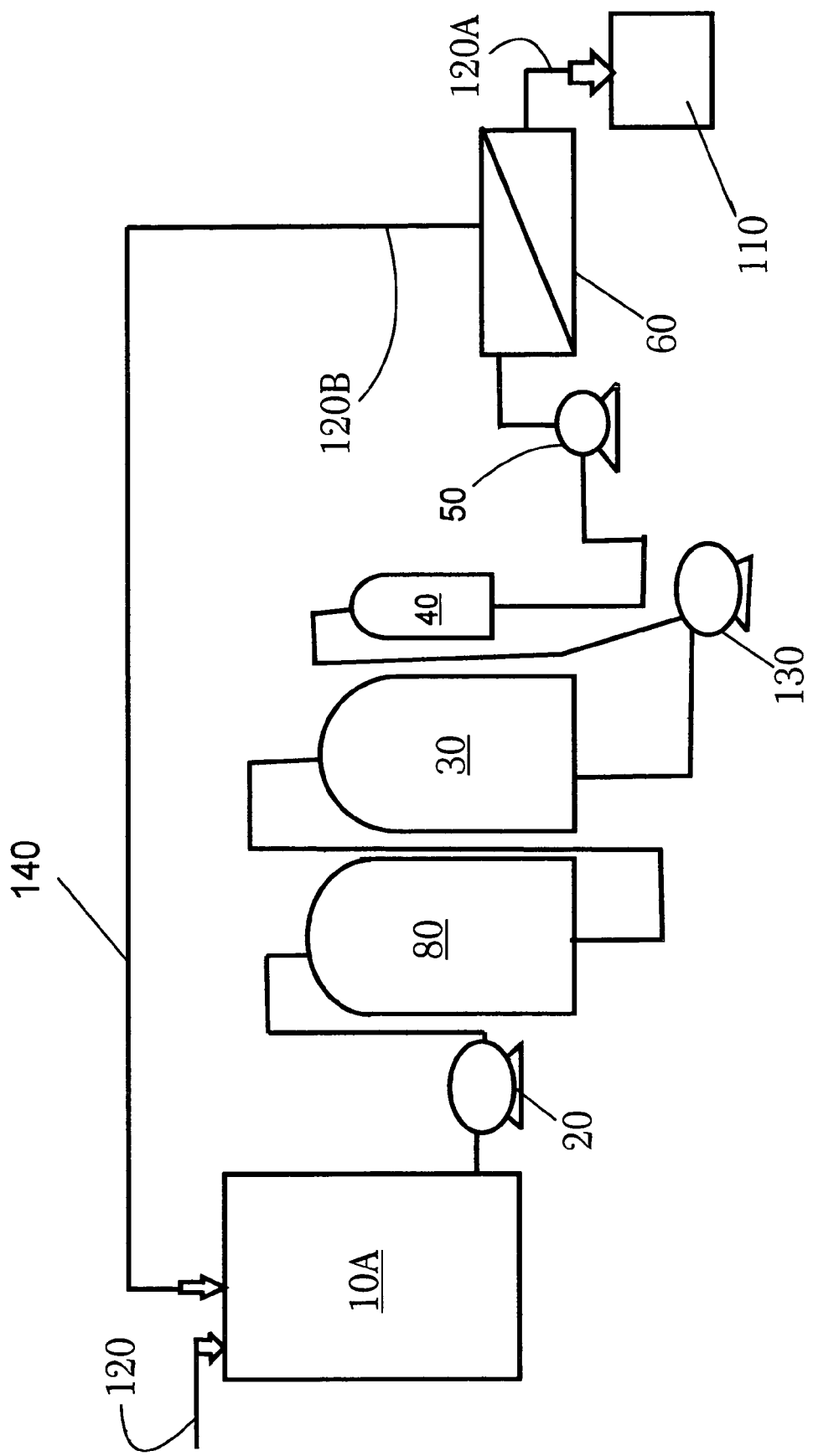
FIG. 3 is a flow chart of a method of treating an aqueous radioactive fluid in a radwaste system according to another exemplary embodiment of the invention illustrating additional filtering aspects of the invention.

As set forth in FIG. 3, the steps included as a preferred embodiment of the invention 10 comprise:
(1) Supplying an (AF) to a supply area (10A);
(2) Carbon filtering the (AF) (80);
(3) Demineralizing the (AF) (30);
(4) Further filtering the (AF) (40);
(5) Conveying the (AF) through an RO (60), and separating the (AF) into a permeate volume 120A and a reject volume 120B (60A);
(6) Recycling the reject volume, without chemical adjustment, to the supply area or the carbon filtering step (140);
(7) Conveying the permeate volume to the monitor area (110).

Figure 4:
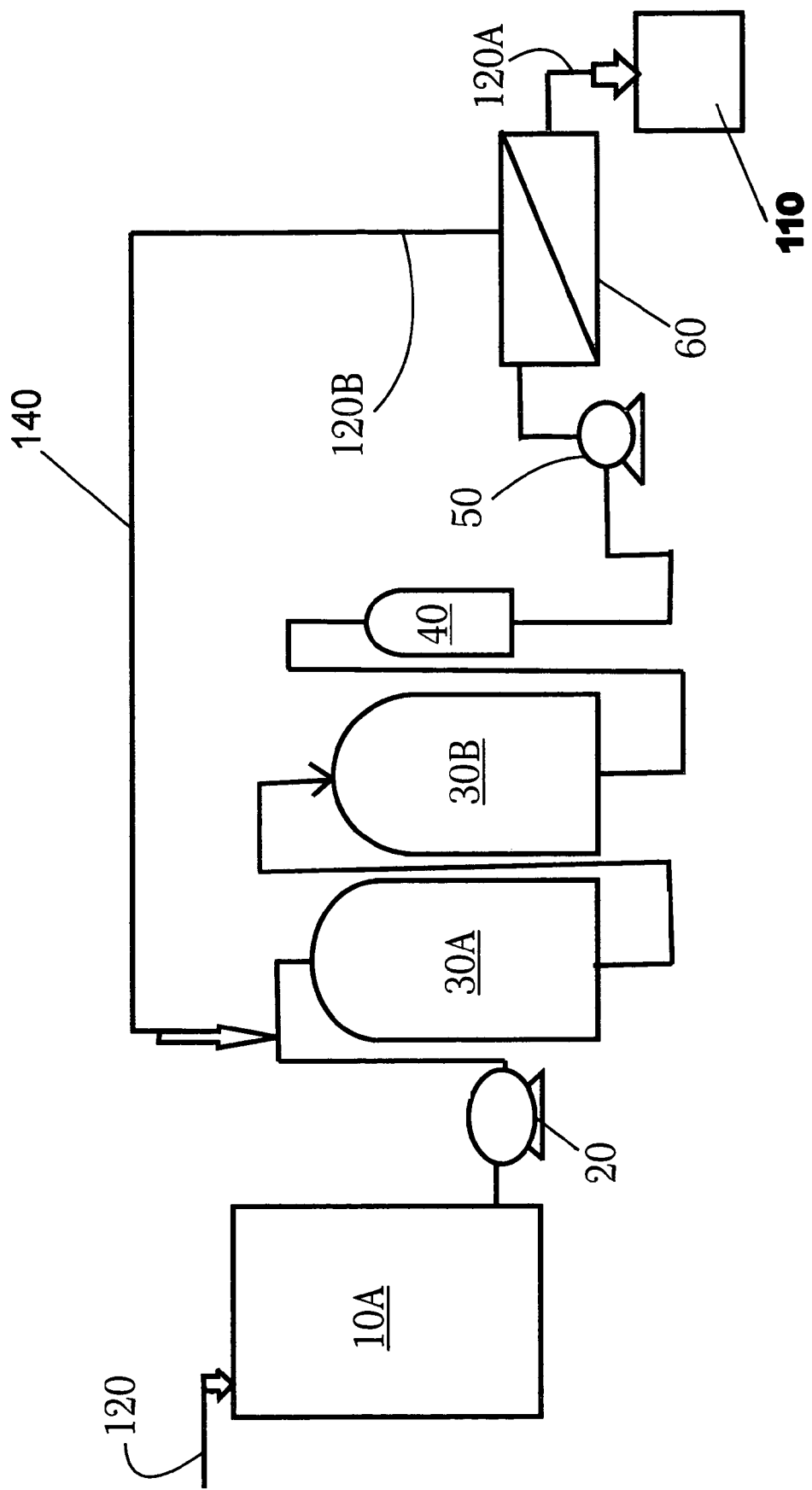
FIG. 4 is a flow chart of a method of treating an aqueous radioactive fluid in a nuclear reactor cycle or radwaste system according to another exemplary embodiment of the invention illustrating additional filtering and demineralizing aspects of the invention.

As set forth in FIG. 4, the steps included as a preferred embodiment of the invention 10 comprise:
(1) Supplying an (AF) to a supply area (10A);
(2) Demineralizing the (AF) in a first area or location (30A);
(3) Further Demineralizing the (AF) in a second area or location (30B);
(4) Filtering the (AF) (40);
(5) Conveying the (AF) through an RO (60), and separating the (AF) into a permeate volume 120A and a reject volume 120B (60A);
(6) Recycling the reject volume, without chemical adjustment, to the supply area 10A or the demineralizing step in the first area 30A (140);
(7) Conveying the permeate volume to the evaluation area (110).

Figure 5:
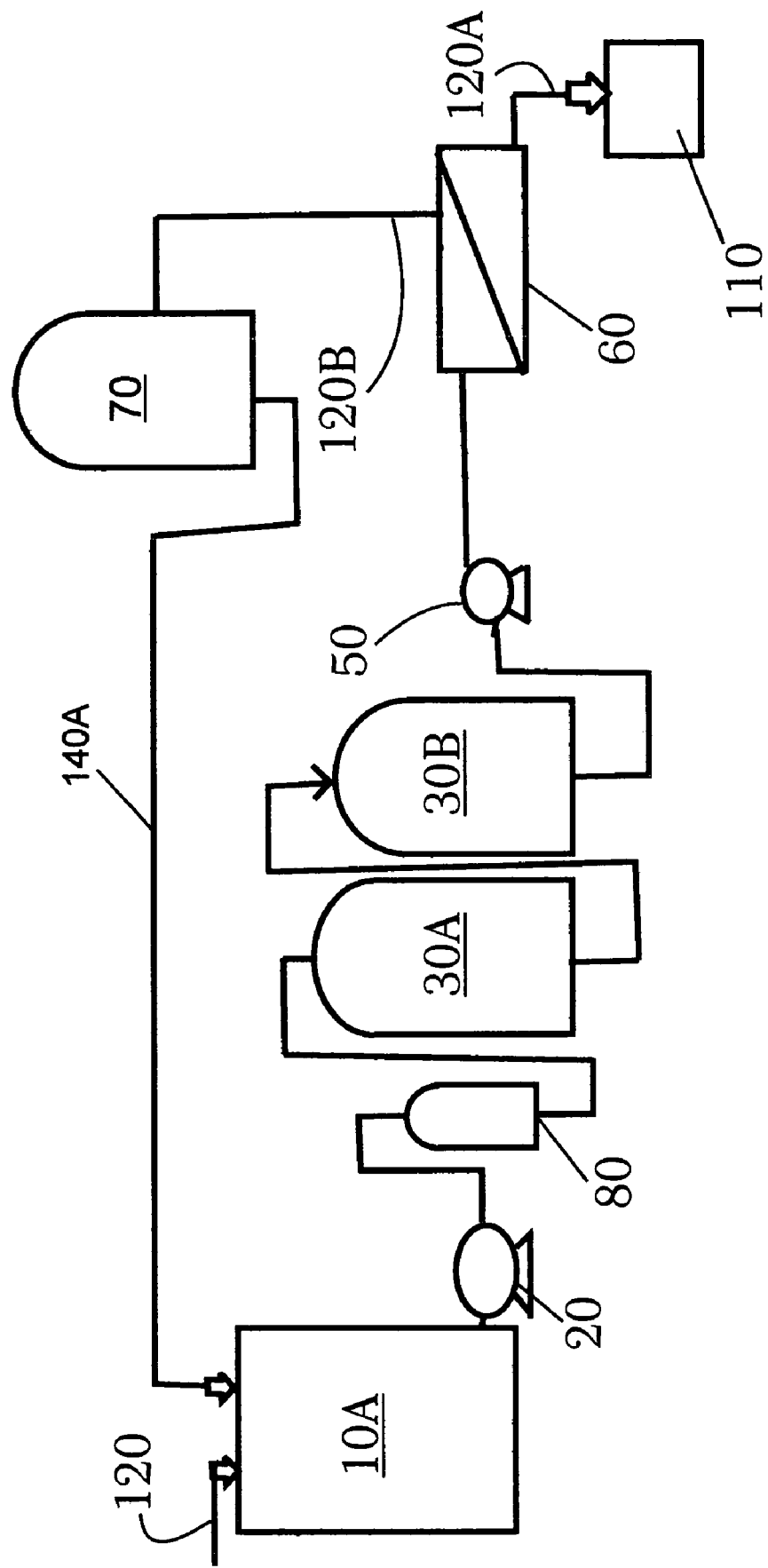
FIG. 5 is a flow chart of a method of treating an aqueous radioactive fluid in a nuclear reactor cycle or radwaste system according to another exemplary embodiment of the invention illustrating additional filtering and demineralizing aspects of the invention.

As set forth in FIG. 5, the steps included as a preferred embodiment of the invention 10 comprise:
(1) Supplying an (AF) to a supply area (10A);
(2) Carbon Filtering the (AF) (80);
(3) Demineralizing the (AF) in a first area or location (30A);
(4) Demineralizing the (AF) in a second area or location (30B):
(5) Conveying the (AF) through an RO (60), and separating the (AF) into a permeate volume 120A and a reject volume 120B (60A);
(6) Passing the reject volume 120B through a reject demineralizer system (70)
(7) Recycling the reject volume to the supply area 10A or the carbon filtering step 80 (140A);
(8) Conveying the permeate volume to the evaluation area (110).

Figure 6:
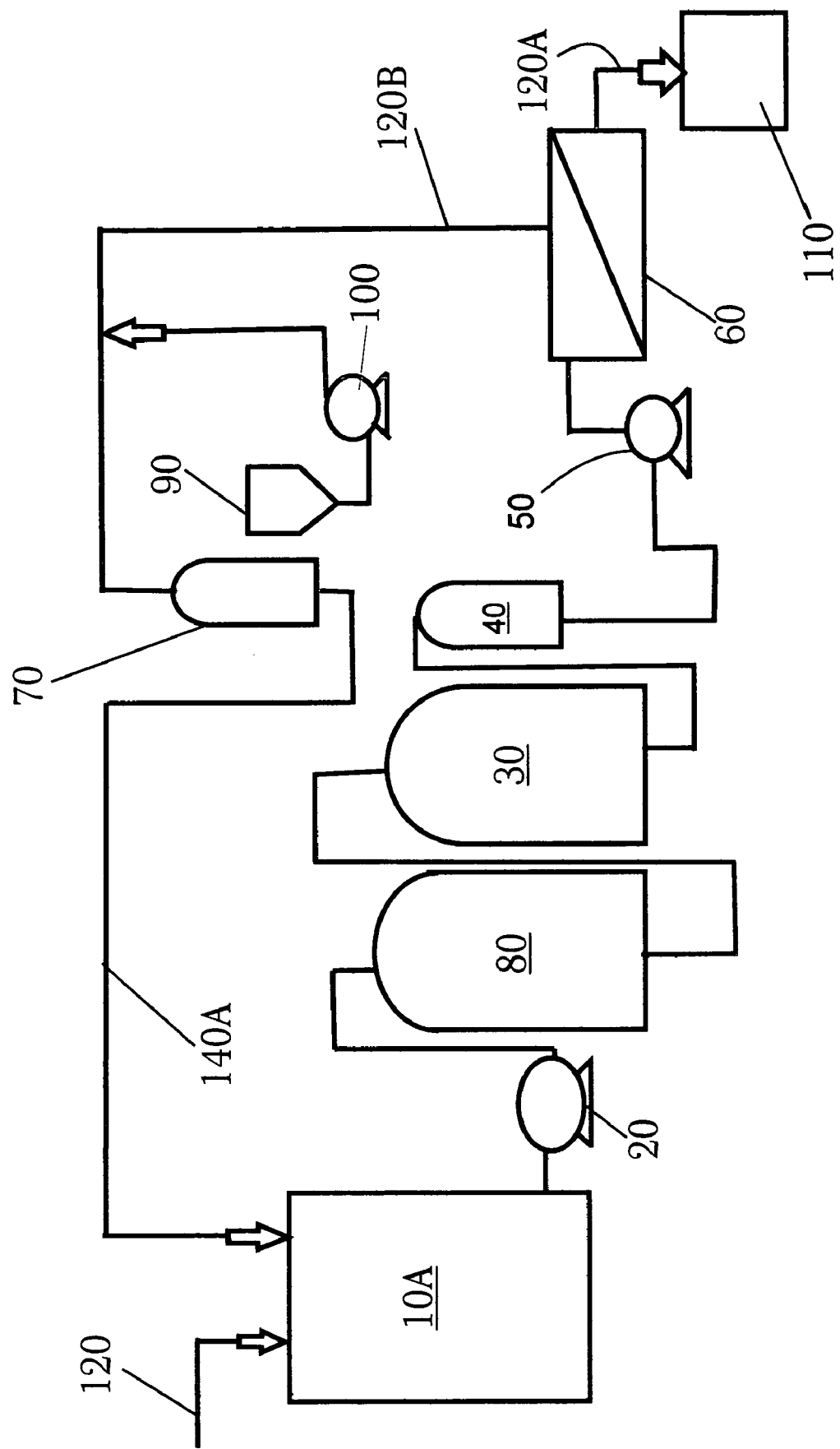
FIG. 6 is a flow chart of a method of treating an aqueous radioactive fluid in a nuclear reactor cycle or radwaste system according to another exemplary embodiment of the invention illustrating additional filtering, chemical addition and reject demineralizing aspects of the invention.

As set forth in FIG. 6, the steps included as a preferred embodiment of the invention 10 comprise:
(1) Supplying an (AF) to a supply area (10A);
(2) Carbon filtering the (AF) (80);
(3) Demineralizing the (AF) (30);
(4) Further filtering the (AF) (40);
(5) Conveying the (AF) through an RO (60), and separating the (AF) into a permeate volume 120A and a reject volume 120B (60A);
(6) Adding a chemical substance to the reject volume 120B or adjusting the pH of the reject volume (90);
(7) Passing the reject volume 120B through a reject demineralizer system (70);
(8) Recycling the reject volume 120B to the supply area or carbon filtering step 80 (140A);
(9) Conveying the permeate volume to the evaluation area (110).

Figure 7:
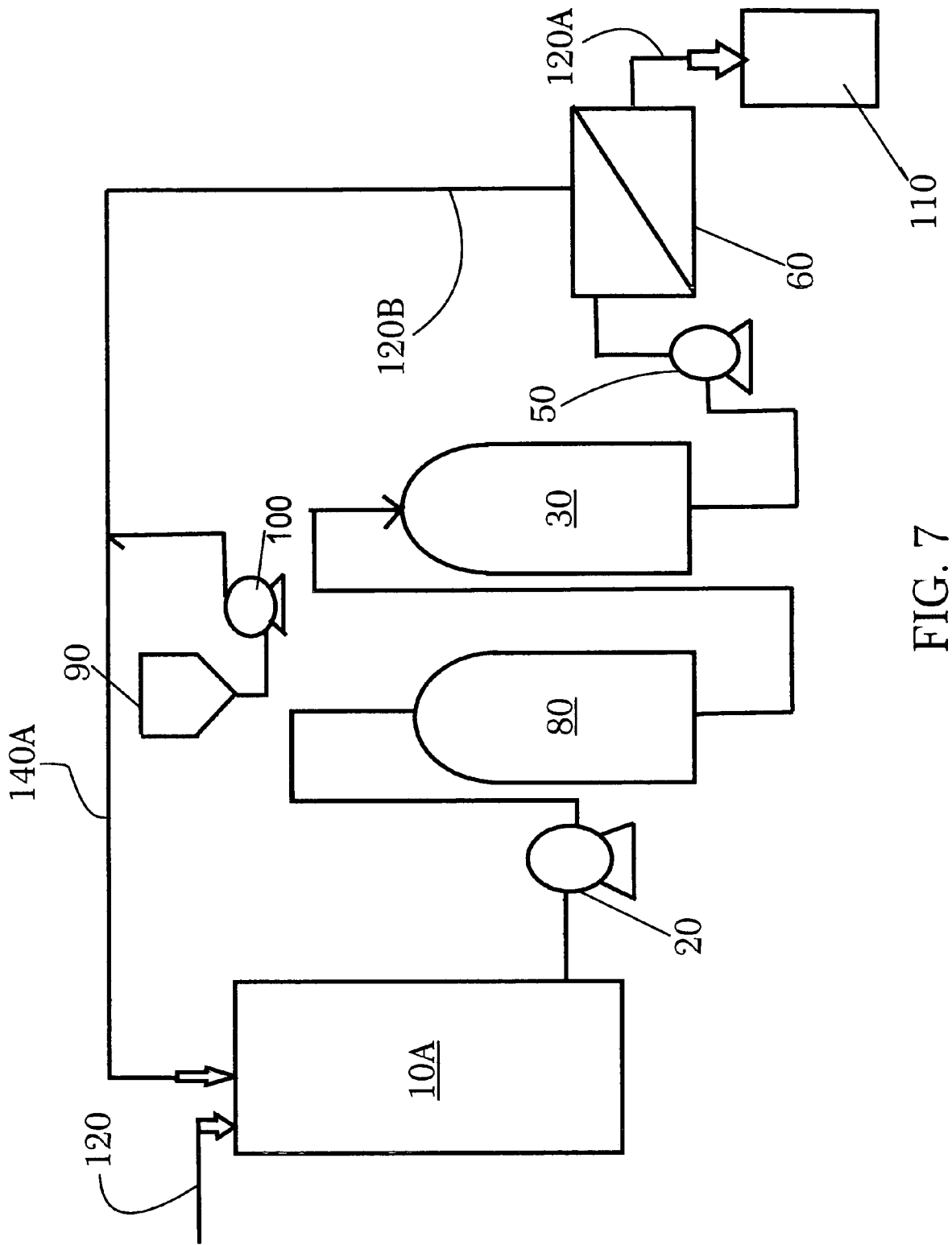
FIG. 7 is a flow chart of a method of treating an aqueous radioactive fluid in a nuclear reactor cycle or radwaste system according to the embodiment of FIG. 1 with and showing additional aspects of the invention regarding chemical addition and recycling.

As set forth in FIG. 7, the steps included as a preferred embodiment of the invention 10 comprise:
Repeating Steps Of FIG. 1, including Steps (1) through (4), therein, set forth above with regard to FIG. 1

(The Added Part in FIG. 7:)
(5) Adding a chemical substance to the reject volume or adjusting the pH of the reject volume (90); (6) Recycling the reject volume to the supply area 10A or carbon filtering step 80 (140A);
(7) Conveying the permeate volume to the evaluation area (110).

Figure 8:
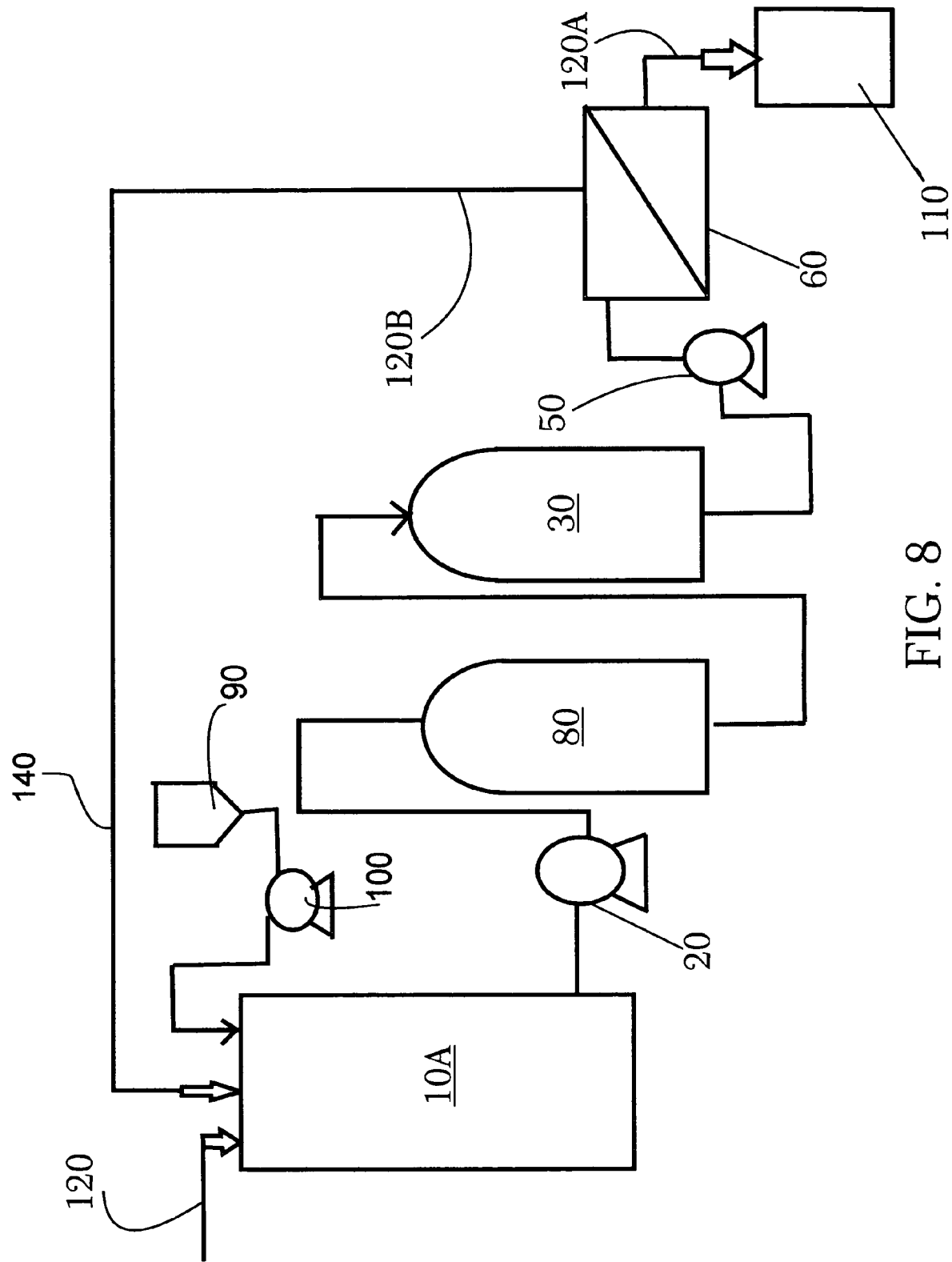
FIG. 8 is a flow chart of a method of treating an aqueous radioactive fluid in a nuclear reactor cycle or radwaste system according to the embodiment of FIG. 1 with and showing additional aspects of the invention regarding recycling and chemical addition.

As set forth in FIG. 8, The steps included as a preferred embodiment: of the invention 10 comprise:

Repeating Steps Of FIG. 1, including Steps (1) through (4), therein, set forth above with regard to FIG. 1

(The Added Part In FIG 8:)
(5) Recycling the reject volume to the supply area (140);
(6) Adding a chemical substance to the supply area(90);
(7) Continuing recycle through the system's steps of(80), (30), (60) and (60A);
(8) Recycling the reject volume 120B as a recycle stream, without chemical adjustment, to the supply area 10A or filtering step 40 (140);
(9) Conveying the permeate volume 120A to the evaluation monitor area (110).

Figure 9:
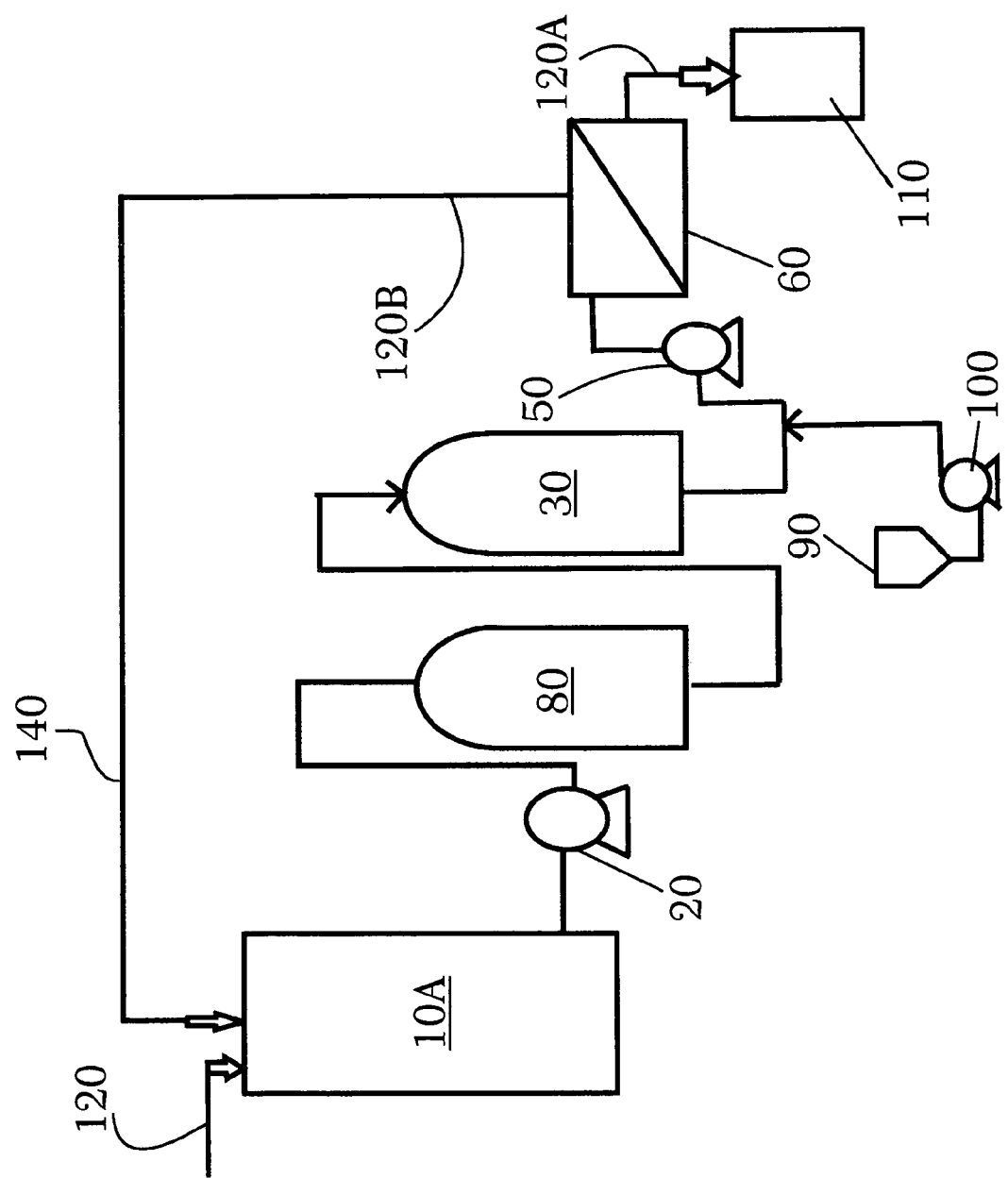
FIG. 9 is a flow chart of a method of treating an aqueous radioactive fluid in a nuclear reactor cycle or radwaste system according to the embodiment of FIG. 1 with and showing additional aspects of the invention regarding chemical addition.

As set forth in FIG. 9, the steps included as a preferred embodiment of the invention 10 comprise:
Repeating Steps Of FIG. 1, including Steps (1) through (3), therein, set forth above with regard to FIG. 1

(The Added Part in FIG. 9:)
(4) Adding a chemical substance to the (AF) (90);
(5) Conveying the (AF) through a Reverse Osmosis unit (RO) 60, and dividing the (AF) into a permeate volume 120A and a reject volume 120B (60A);
(6) Recycling the reject volume 120B to the supply area 10A or carbon filtering step 80 (140);
(7) Conveying the permeate volume to the evaluation area (110).

Figure 10:
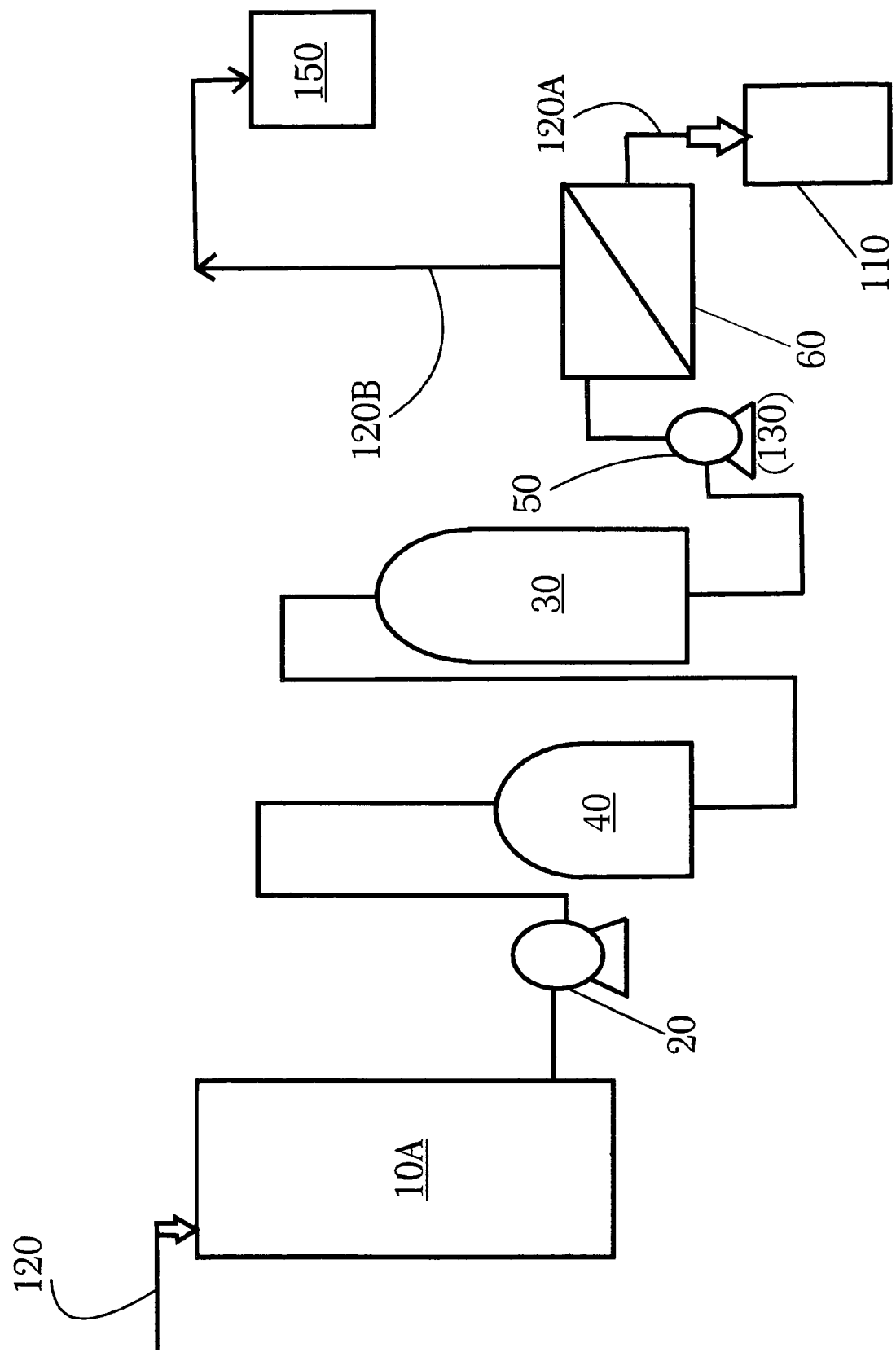
FIG. 10 is a flow chart of a method of treating an aqueous radioactive fluid in a nuclear reactor cycle or radwaste system according to the embodiment of FIG. 2 with and showing additional aspects of the invention regarding conveyance of the reject liquid volume to a holdup area.

As set forth in FIG. 10, the steps included as a preferred embodiment of the invention 10 comprise:
Repeating Steps Of FIG. 2, including Steps (1) through (4), therein, set forth above with regard to FIG. 2

(The Added Part in FIG. 10:)
(5) Conveying the reject volume 120B to a Holdup Area 150;
(6) Conveying the permeate volume to an evaluation area 110, for evaluation, monitoring or further use.

Figure 11:
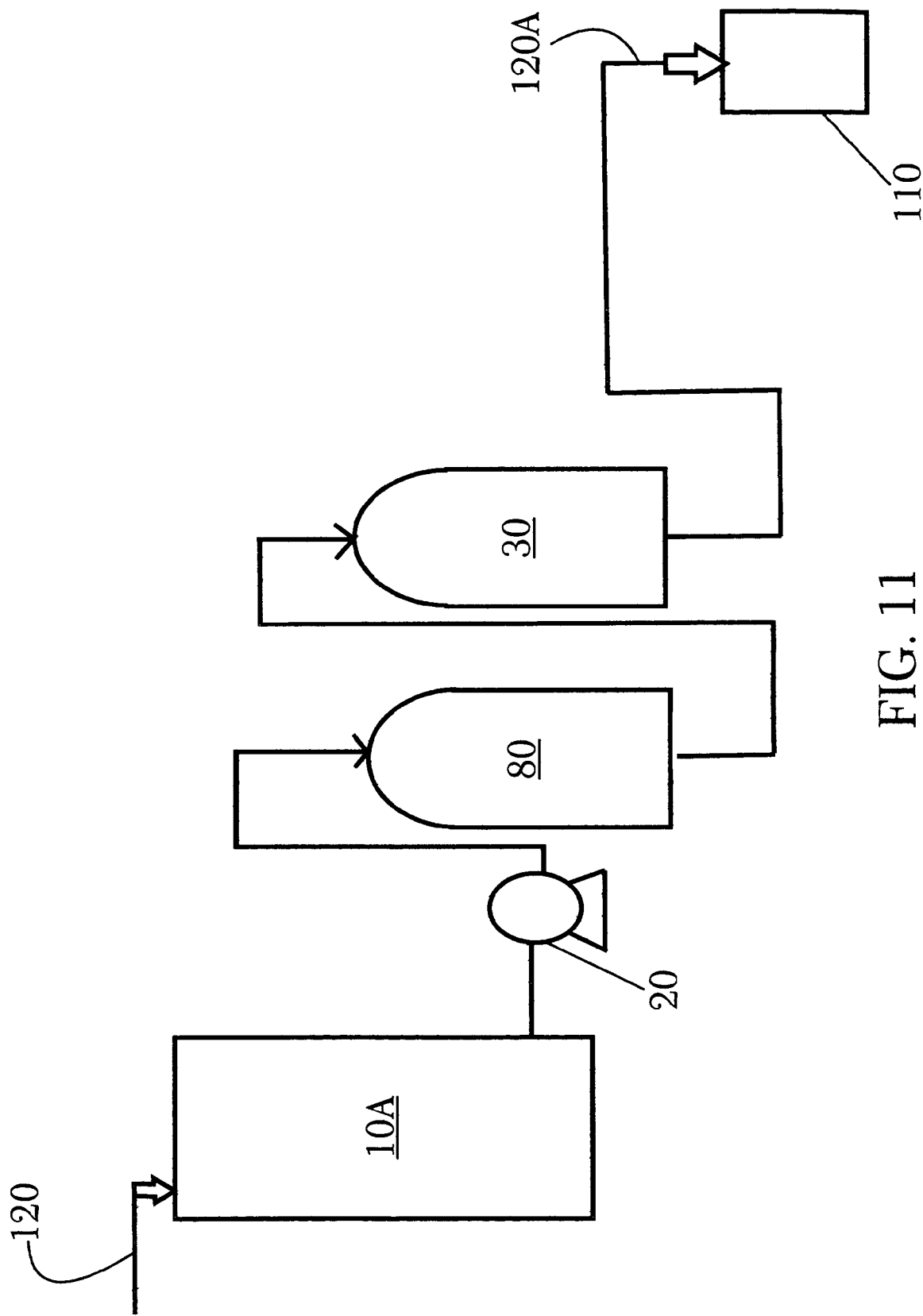
FIG. 11 is a flow chart of a method of treating an aqueous radioactive fluid in a nuclear reactor cycle or radwaste system according to the embodiment of FIG. 1 with and showing additional aspects of the invention regarding bypass of the RO step.

As set forth in FIG. 11, the steps included as a preferred embodiment of the invention 10 comprise:

Repeating Steps Of FIG. 1, including Steps (1) through (3), therein, set forth above with regard to FIG. 1

(The Added Part in FIG. 11:)
(4) Bypassing an RO 60, and conveying a wastestream to an evaluation area 110.

With regard to the embodiment of FIG. 11, it should be noted that occasionally water is presented in which certain components are of a concentration that cannot be processed through the RO without an unacceptable risk of membrane fouling. These waters, held to be a small percentage of the time and volume, may require processing through the IX but bypassing of the RO unit. In these instances, the invention still retains its value in the overall retention of contaminants and substantial reduction in waste volumes generated over standard operations of an RO unit.

In those instances when all contaminants of interest are not present or have been removed by the IX system, the RO can be bypassed. This permits the discharge of the inventory of species of no environmental concern (i.e. boron or silica) that otherwise may concentrate up in the current batch of (AF). Thereafter, the RO may then be returned to the normal polishing mode.

As indicated above, It is an object of the present invention to provide a permeate stream and a reject stream, so that the reject is recycled back to the front of a system of which it is a part of, so that the removal percentage of demineralizers employed in such a system is great enough to prevent excess buildup of most all isotopes and other fouling chemicals. The demineralizers are typically effective at removing >90% of the dissolved components in the water except boron and silica. Boron is not usually an environmental discharge concern and can be utilized if recycled. If silica is present in excessive quantities additional treatment may be required although in many cases sufficient passage in the membranes is possible when feed concentrations are low.

The supply area 10A is provided, in preferred embodiments, with one or more tanks for collection of fluid for batch processing. Continuous processing is possible if sufficient waste volumes are available. The tank is capable of some solid/liquid separation due to the quiet nature between processing batches where natural settling and coagulation occurs. These solids are either retained in the tank for later removal or are collected in downstream filters.

Additionally, the supply area 10A contains in preferred embodiments a method of mixing the recycle and the influent so that the supply is more homogeneous.

In recycle to the supply area, chemical changes can occur just through the concentration process, and further oxidation would generally occur in the supply tank as exposure to air and other potential sources of water occurred over time or as a part of aging.

In related preferred embodiments the supply area 10A is utilizable as a point where internal recycle streams may re-enter the processing stream. The recycle stream may also enter after the supply area 10A. Also, in preferred embodiments, the recycle may enter a future supply area to permit further reaction time and exposure (or aging) with regard to other types of wastewater 120. This wastewater is then processed at a later time.

In this regard, as stated above, it is an object of the present invention to gain the many advantages of rejecting back to a plant or facility with which it is associated; including, but not limited to; the reduction of activity rejected and returned to the plant; the reduction of waste classification of concentrates and/or resulting dried solids; the maximization of resin usage by exposing resin to a higher influent activity concentration; prevention of return to the plant or environmental discharge of difficult to remove isotopes; the facilitation of scavenging of targeted isotopes, such as antimony, in a smaller waste stream, then provided; and the decrease on osmotic load through the increase of permeate flow. It should be noted that occasionally water is presented for which certain components build up in the system that cannot be cost effectively removed. This may require a periodic discharge of the reject or a bypassing of the RO unit. This is held to be a small percentage of the time and volume and the invention still retains its value in the overall retention of contaminants and substantial reduction in waste volumes generated over standard operations of an RO unit. The initial influent in preferred embodiments is the waste stream 120 from a facility that enters the Supply Area (10A). This waste stream determines the waste system processing requirements and volume-wise usually consists of >90% of the flow into the supply area with the recycle stream (120B, 140 or 140A) making up the balance of the flow into the Supply Area 10A.

The RO system 10 has a preferred method of operation where the recycle stream does not materially impact the influent concentrations and volumes, and there is a system mass balance throughout the RO system 10. The recycle stream concentrations are preferably near the concentrations of the influent stream so as to not significantly impact the requirements of the overall system. A mass balance can always be conducted around the system to assure that no accumulation of any dissolved components is occurring. The system is designed so that constant removal efficiency is maintained across demineralizers and filters so that no significant buildup in dissolved constituents occurs within the system that would result in the system requiring discharge of a separate liquid waste stream. This is the main differentiation with a standard RO system whether it is located ahead or behind a demineralizer system. The reject from previous systems always generated a liquid concentrate waste stream that had to be disposed at a significant cost. This system generates no additional waste streams yet produces higher quality effluent.

TABLE 1

| Equipment (#) | Flow Rate Inlet (gpm) | TDS Inlet (ppm) | TDS Removal (ppm-gal) | TDS Outlet (ppm-gal) | TSS Inlet (ppm) | TSS Removal (ppm-gal) |
|---|---|---|---|---|---|---|
| 1 | 100 | 1000 | | | 9.8 | |
| 3 | 100 | 1000 | 98,000 | 1000 | 0 | |
| 4 | 100 | 1000 | | | 9.8 | 980 |
| 6 | 100 | 10 | 1000 | 0 | 0 | |
| 11 | 98 | 0 | | | 0 | |
| 12 | 98 | 1000 | | | 10 | |
| 14 | 2 | 500 | | 1000 | 0 | |

Table 1, above, shows an example of concentrations of dissolved solids (TDS) and suspended solids (TSS) as they are removed and transferred through the system. This indicates an equilibrium condition that eventually exists in a properly operated system.

In preferred embodiments the reject flow is adjusted to either improve system removal efficiency or to improve throughput capacity. If the demineralizers (demins.) decrease in efficiency then the recycle stream may have to be increased to maintain effluent quality in that the total removal of the demins and filters must continue to equal the influent stream loading.

The conveyance subassembly or means 20, in preferred embodiments, is a means of conveying the AF or plant wastewater 120 through subsequent process vessels and piping. This is usually supplied through a pump; but pressurization of vessels, gravity or other means can be employed.

Mechanical filtration 40 is applicable to remove particulate, if present, prior to the demineralizer 30, reverse osmosis unit 60, or carbon filter 80. Many types of mechanical filtration can be utilized including but not limited to bag filters, cartridge filters, wound filters, membrane filters, sintered metal and others. The mechanical filters provide protection to the RO membranes to prevent particulate fouling in the spacers or on the membrane surfaces; therefore, reducing effective flow and flux areas.

The demineralizer 30 or plurality thereof, are normally pressure vessels that contain a media capable of ion exchange or ion capture of dissolved and particulate matter. Removal in such a demineralizer 30 is theoretically predicated on the phenomenon where dissolved, charged ions captured thru their opposite charge to a fixed charge on the media, thus lower this ion concentration in solution. A number of other media are also available and may be used to capture specific, sized or targeted ions through a mechanism that combines a much lower ionic charge; but utilizes chambers in the material that have specific size that approximate the physical size of the ion to cause a capture of this size ion. An ion large in size cannot enter; and smaller ions that enter these spaces do not have enough contact area to affect a charge capture, so they are eventually released.

Some ion exchange material also has the potential to remove organics through an adsorption process on the surface of the media. Other media is also designed to capture fine particulate within the media due to high macro-porous area where its inner, tortuous path causes small particles to be removed. Other larger particles can also be removed at inter-particle contact points in the media.

These and other types of media can be employed within the spirit of the present invention. In this regard, the present method of the RWRO system 10 permits scavenging of targeted isotopes, such as Cesium and Antimony; and possibly Cobalt, Cesium, Iron-Iodine, or others; by virtue of the present system's ability to utilize selective ion exchange media with regard to a smaller and more concentrated waste stream Some isotopes, such as Antimony (Sb), are not held as strongly to normal ion exchange media. This may require the use of special ion specific media that is often ten times more expensive but more effective. By limiting the stream flow rate that must be treated, the volume of selective media can be greatly reduced making the cost of such media much lower. The reject flow rate is normally 2-10% of the feed flow rate in the present RWRO system 10. Additionally, in conventional processes, Tritium is not removed by either RO or ion exchange to an appreciable extent. Other elements or isotopes thereof not easily removed have included manganese, iron, silver, chromium and niobium.

The importance of tritium is that if the present RWRO system is used for recycle, the tritium which usually exits the plant in the released water, is recycled to the plant where it is allowed to decay as it has a half-life of 12.5 years. The highest isotopic discharge from any PWR plant is tritium, which is usually 3-6 orders of magnitude above any other isotope. Currently the utilities must report the discharge of hundreds to thousands of curies of tritium to the local waterways, as compared to the discharge of 0.1 to 1.0 curies to little as 0.01 curies of all other isotopes. Local and downstream residents fear that this will enter their drinking water and will adversely affect their health. Accordingly, the ability of the present method 10 to concentrate such isotopes or elements on recycle and utilize higher quality and more selective ion exchange media in passage through the present system, greatly improves the ability to eliminate or segregate such materials from influent waste streams.

As indicated above, the invention includes a method of maximizing resin utilization, more particularly polishing an aqueous fluid or (AF) supplied to a system at a supply area and selectively scavenging for targeted isotopes; by permitting greater concentrations thereof and exposing filter media and resin to a higher influent activity concentration. This also permits some bleed through of the resin that is ordinarily not permitted if a polisher is not present at the end of the train.

The purpose of the demineralizer 30 in this invention is to reduce the ion concentration prior to the RO 60 to permit effective removal of the waste material or radwaste to produce water that is recyclable or dischargeable.

Some of the important species removed by demins that could easily result in fouling are calcium, magnesium, sulfate and carbonate. As indicated in part above, the effective range of removal is dependent upon the nature of the subject ionic species, and varies between about 70 and about 99.99% removal with most species being in the upper 90% removal. Therefore, in utilizing the present invention, a decontamination factor (DF) of from about 7 to about 10,000 is possible.

Without the presence of an upstream demineralizer 30 the membranes in the RO 60 would have the potential of rapid fouling due to the precipitation of saturated species in the boundary layer of the membranes.

The RO 60 can also be an electrodeionization (EDI) assembly or process which utilizes membranes and electrical charge to continuously regenerate ion exchange media. Those skilled in the art will understand the nature and function of a demineralizer, and those available on the market.

The EDI generates the same two effluent streams, 120A and 120B.

However, in preferred embodiments of the RWRO system 10, where regular demineralization is used, the creation of acid conditions by deployment of cation resin to reduce pH adjustment, improves BA passage. The use of hydrogen form cation resin before the RO 60 results in lowering of the pH which converts more of the boron to acid form which increases the passage for either recycle or discharge. Therefore, this acts in reducing the boron captured for disposal.

In this regard, therefore, in some of the preferred embodiments of the invention 10, further benefit is achieved by utilizing the hydrogen form resin immediately before the RO 60 without any further treatment. In this case the use of a hydrogen form resin can again lower the pH. Conversion to boric acid improves the passage of boron thus reducing waste generation and provides for better recovery of boron if recycle is chosen.

Due to pressure drop in the system or limitations on pressure boundaries, a further conveyance means or booster unit or pump 130 is available for use in preferred embodiments of the invention 10; and, by virtue of the work to be performed, may be required.

The use of a reverse osmosis (RO) step 60 frequently requires significant pressure to overcome osmotic pressures, as explained, at least in part, above. Therefore, a dedicated reverse osmosis conveyance unit or pump 50, or like system, is used to supply the requirements of the RO 60.

The RO 60 of the RWRO system 10 can utilize either polyamide or cellulose acetate membranes, as exemplary equipment, to provide the proper retention and passage of the desired isotopes depending upon the application, as well as a number of other specialized membrane units or systems.

The reverse osmosis unit 60 is the polishing unit in the overall system of the invention. Any species that are not permitted for either discharge or reuse are rejected and sent back for reprocessing without generating a new waste stream. Upon return, the system is permitted another chance to remove the required constituents in a more concentrated form or in an altered more easily removed state.

In this regard, the following terms and definitions should be noted:

Recycle, as utilized herein, and referenced as a part of method steps herein (120B, 60A, 140, 140A) is deemed to be a stream contained within the overall RWRO system 10 (Supply/Filter/Demin/RO steps) where a stream is sent back to a previous area in the system and merged with another stream or enters a temporary holding container for later introduction into the same group of systems. Reuse, as utilized herein, is deemed to be an effluent stream from the system where the produced stream is again used by the larger facility that initially generated the waste stream rather than being discharged to the environment. Discharge, as utilized herein, is deemed to be a stream that leaves the inventions system and is released to the environment (i.e., river, lake, ocean, sanitary sewer system, etc.) after meeting discharge requirements. Waste stream (120), as utilized herein, is deemed to be a solid or liquid accumulation of material that must be disposed as a regulated material for disposal at a different offsite location. These may include radiological, hazardous, mixed, and sanitary wastes.

"Demineralization" is defined as a chemical engineering term as "A process for cleaning water in which the anions and cations are removed separately by absorption in synthetic exchange materials, leaving the water free of dissolved salts." Ed. P. M. B. Walker, *Chambers Science and Technology Dictionary*, W & R Chambers Ltd. And Cambridge University Press: Cambridge, New York, 1988, p. 236. It I is also defined as "Removal from water of mineral contaminants, usually present in ionized form." Revised, R. J. Lewis, Sr., *Hawley's Condensed Chemical Dictionary*, 12th ed., Van Nostrand Reinhold: New York. p. 353; and cross-referenced with terms including"desalination" and "desalting", " . . . for removing dissolved mineral salts", Id., p. 356. "demineralization" is also defined as "the process of removing mineral matter or salts (as from water)". *Merriam-Webster Online Dictionary*, http://www.memam-webster.com/dictionarv/demineralization.

The evaluation, appraisement or monitoring area 110 is a tank or reservoir means which comes to house a permeate volume 120A separated from the AF 120, after RO 60, where samples are taken and evaluated for use, storage, recycle or later further use. However the area 110 can also be an area in the pipeline or conveyance means, within the scope of the invention, where continuous radiation isotope monitoring is conducted.

From the monitoring area 110 the water is preferably, either reused or discharged; but can be directed, as indicated, by example herein, to other uses.

One such other use includes, without limitation, conveyance of the reject volume 120B to the holdup tank or area 150, shown by example, schematically, in FIG. 10. Various types of such holdup tanks 150 can be utilized, and placed at different positions in the RO system 10, in preferred embodiments thereof. The tanks 150 are generally put on recirculation prior to pumping and often during pumping so the contents are well mixed prior to delivery back to another part of the system 10. The reject stream 120B usually enters the tanks as part of the floor drain collection system of the plant so it is already mixed with other plant water prior to entering the tank.

The reject demineralizer assembly 70 functions the same as the demineralizer assembly 30 described above. However, in this case only the reject stream or volume 120B is passed through the assembly 70. The smaller volume and higher ionic concentrations change the equilibrium to more favorable conditions. The lower flow rate also permits the use of smaller quantities of media which make specialized, more expensive media more feasible. It is within the scope and spirit of the invention, in this regard to vary retention time and flow characteristics to address given jobs or waste substances being processed.

With respect to the chemical supply tank 90, there are times, in processing the permeate and reject volumes 120A and 120B, respectively, when a chemical adjustment may be required. The chemical supply tank 90, in preferred embodiments, can be in the form of a feed tank or chemical feed container or other supply means. It is utilized in preferred embodiments of the invention to facilitate pH adjustment, precipitation of specie(s) and transformation of species to alternate chemical forms. In so utilizing the chemical supply tank 90, the introduction of a chemical substance or component can be facilitated to occur any where from the supply area 10A, between any of the steps or components in the RWRO system 10, prior to RO 60; and in any location where conveyance of the reject stream 120B occurs in preferred embodiments of the invention. The chemical supply conveyance or pump 100 is utilized in the present invention to inject a chemical feed into the system from the supply tank 90, or other suitable chemical supply source. The conveyance 100 can include a gravity means, a pressurized vessel and various types of pumping; as well as other means of conveying or making an adjustment chemical available to the RWRO system 10 from the chemical supply tank 90.

There are many commercially available units of equipment which can be utilized to facilitate the steps of the Method of the present invention 10, which will be understood by those skilled in the art.

It should be understood that the foregoing description is only illustrative of the invention. Various alternatives and modifications in the structural and functional features of the feed means can be devised by those skilled in the art without departing from the invention. Accordingly, the present invention is intended to embrace all such alternatives, modifications and variations which fall within the spirit and scope of the appended claims.

What is claimed is:

1. A method of processing an aqueous radioactive fluid or (AF) to maximize boron control, said (AF) having radioactive isotopes and at least salt, boron and nonradioactive constituents, supplied to a supply area from a source area consisting of a group of source areas including a nuclear reactor, a radwaste system and a nuclear reactor plant facility; said method having at least one step of conveying a liquid volume of the (AF) to a sole discharge and release point for liquid effluents of the (AF) in an ambient environment apart and outside of the source area, said method comprising the steps of:

(a) demineralizing the (AF) by or as a function of ion exchange for enhancing boron passage through the RO membranes and for reduction of the amount of radioactive isotopes passing therethrough while substantially permitting said salt, boron and nonradioactive constituents to pass through and lowering the pH thereof to an acidic range at least such that substantially most of the boron can later pass through an RO membrane; and then (b) polishing the (AF) by reverse osmosis or (RO), and (c) dividing the (AF) into a permeate liquid volume and a reject liquid volume, the permeate volume having a greater fraction of the boron constituent present in the (AF to permit recovery therefrom and a lower isotopic, organic and mineral content, and the reject volume having a substantially reduced concentration of boron and an increased isotopic, organic and mineral content;

(d) recycling the reject volume; and (e) conveying the permeate volume to said at least one step of conveying a liquid volume of the (AF) to a sole discharge and release point for liquid effluents of the (AF) in an ambient environment apart and outside of the source area.

2. The method of claim 1, wherein, prior to step (a), the step of filtering the (AF).

3. The method of claim 2; wherein, as a part of step (d), the reject volume being recycled to said filtering step.

4. The method of claim 2; wherein, as a part of, step (d), the reject volume being recycled to the supply area.

5. The method of claim 2; wherein, as a part of step, (d), recycling the reject volume to a radwaste holdup area.

6. The method of claim 1; wherein, as a part of the step (d), the reject volume being recycled to the supply area.

7. The method of claim 1, wherein, prior to step (a), the step of carbon filtering the (AF).

8. The method of claim 7, wherein, as a part of step (d) the sub-steps of recycling the reject volume through the carbon filtering step, step (a), step (b), and step (c).

9. The method of claim 7; wherein, as at least a part of step (d), recycling the reject volume back to the supply area.

10. The method of claim 7; wherein, as a part of step (d), recycling the reject volume to a radwaste holdup area.

11. The method of claim 1; wherein, after step (a), the step of further demineralizing the (AF) in a separate area from that of step (a).

12. The method of claim 11; wherein, after said further demineralizing step, the step of filtering the (AF).

13. The method of claim 12; wherein, as at least a part of the filtering step, the sub-step of removing resin, carbon fines and other foulants contained in said (AF).

14. The method of claim 12; wherein: as a part of step (d), the sub-steps of recycling the reject volume through step (a), the further demineralizing step, the filtering step, step (b), and step (c).

15. The method of claim 12; wherein, as at least a part of step (d), recycling the reject volume to the supply area.

16. The method of claim 7; wherein: after step (a), the step of further filtering the (AF).

17. The method of claim 16; wherein, as at least a part of the step of further filtering the (AF), the sub-step of removing resin, carbon fines and other foulants contained in said (AF).

18. The method of claim 16; wherein, as a part of step (d), the sub-steps of recycling the reject volume through the carbon filtering step, step (a), the further filtering step, step (b), and step (c).

19. The method of claim 16; wherein, as at least a part of step (d), recycling the reject volume to the supply area.

20. The method of claim 16; wherein, as a part of step (d), recycling the reject volume to a radwaste holdup area.

21. The method of claim 7; wherein, after step (a), the step of further demineralizing the (AF) in a separate area from that of step (a).

22. The method of claim 21; wherein, after step (c), and before step (d), the step of reject demineralizing the reject volume.

23. The method of claim 22; wherein, as a part of step (d), recycling the reject volume to the supply area.

24. The method of claim 22; wherein, as a part of step (d), the sub-steps of recycling the reject volume through the carbon filtering step, step (a), the further demineralizing step, step (b), and step (c).

25. The method of claim 22; wherein, as a part of step (d), recycling the reject volume to a radwaste holdup area.

26. The method of claim 14; wherein: after steps (b) and (c), the step of adding a chemical substance to the reject volume for one of a group of purposes consisting of pH adjustment to an acidic or alkaline range, precipitation of at least one chemical specie and transformation of at least one chemical specie to an alternate chemical form.

27. The method of claim 14; wherein, after steps (b) and (c), the step of adjusting the pH of the reject volume to an acidic or alkaline range for one of a group of purposes consisting of precipitation of at least one chemical specie and transformation of at least one chemical specie to an alternate chemical form.

28. The method of claim 26; wherein, after said step of adding a chemical substance to the reject volume, the step of reject demineralizing the reject volume.

29. The method of claim 26; wherein: after the step of adding a chemical substance to the reject volume, and as a part of step (d), the sub-steps of at least recycling the reject volume through the carbon filtering step, step (a), the further filtering step, step (b), and step (c).

30. The method of claim 22; wherein, as at least a part of step (d), the reject volume being recycled to the supply area.

31. The method of claim 14; wherein, as a part of step (d), recycling the reject volume to a radwaste holdup area.

32. The method of claim 22; wherein, as a part of step (d), recycling the reject volume to a radwaste holdup area.

33. The method of claim 7; wherein: as a part of step (d), recycling the reject volume back to the supply area.

34. The method of claim 9; wherein: as a part of said recycling the reject volume back to the supply area, the sub-step of adding a chemical substance to the reject volume before reaching the supply area.

35. The method of claim 9; wherein, as a part of said recycling the reject volume back to the supply area, the sub-step of adjusting the pH of the reject volume.

36. The method of claim 23; wherein: after said recycling the reject volume back to the supply area, adding a chemical substance to the supply area.

37. The method of claim 7; wherein: before said carbon filtering step, the step of adding a chemical substance to the (AF) in the supply area.

38. The method of claim 7, wherein after step (a), but before step (b), the step of adding a chemical substance to the (AF).

39. The method of claim 1; wherein: prior to step (b), the step of converting any sodium borate contained in the (AF) to boric acid.

40. The method of claim 7; wherein: prior to step (b), the step of converting any sodium borate contained in the (AF) to boric acid.

41. The method of claim 1; wherein: as a part of step (d), adjusting the pH of the reject volume.

42. The method of claim 1; wherein: after step (a), but prior to step (b), the step of filtering and removing any resin, carbon fines and other foulants contained therein.

43. A method of treating a primary aqueous radioactive fluid or (AF) in a nuclear reactor area to generate at least one permeate liquid volume having boron and non-radioactive components for conveying from the nuclear reactor area for release at an ambient environmental release point for liquid effluents of the (AF) apart and outside of the nuclear reactor area without generating a liquid waste stream for separate non-environmental disposal, and for maximizing resin usage within an ion exchange resin more particularly polishing the (AF) selectively scavenging for targeted isotopes by permitting greater concentrations thereof and exposing filter media and resin to a higher influent activity concentration; the (AF) being supplied to a system at a supply area, said method comprising the steps of:

prefiltering the (AF) to reduce fouling constituents therein by a step comprising at least one step selected from a group consisting of: the step of filtering the (AF), the step of filtering a liquid volume on recycle, the step of carbon filtering the (AF) and the step of carbon filtering a liquid volume on recycle;

demineralizing the (AF) by gross ion exchange such that between up to about 99% of contaminants, and fouling chemicals and materials in the (AF) are removed with the exception of boron and silica present m the (AF), thereby concentrating those contaminants and isotopes that still remain into demineralization media and lowering the pH of substances that pass through such that substantially most of the boron can later pass through an RO membrane as boric acid moieties;

particularly polishing the (AF) by reverse osmosis or (RO) for said selectively scavenging for targeted isotopes, and for other dissolved materials when present and remaining;

dividing the (AF) into a permeate volume and a reject volume, the permeate volume having a high concentration and fraction of Boron and a lower isotopic, organic and mineral content, and the reject volume having an increased isotopic, organic and mineral content and a substantially greater concentration of reject ions and contaminants in relation to the (AF) prior to the dividing step;

recycling the reject volume to one and further of said steps of the method, at said higher influent activity concentration, for said scavenging for targeted isotopes; and conveying the permeate volume to said ambient environmental release point for liquid effluents of the (AF).

44. The method of claim 43, wherein said selectively scavenging for targeted isotopes includes the step of adjusting the ion exchange media for selective sensitivity for respective isotopes from a group consisting of Antimony, Cobalt, Cesium, Iodine, Tritium, manganese, iron, silver, chromium, niobium, and other environmentally dangerous isotopes and elemental forms.

45. A method utilized in a primary aqueous radioactive liquid or (AF) of a nuclear reactor, for generating an aqueous liquid waste having salts, boron and non-radioactive constituents for release to an outside ambient environment without generating an aqueous waste stream for separate non-environmental disposal, for generating a separate aqueous liquid volume having a reduced volume having substantially only radioactive contaminants, for maximizing resin usage within an ion exchange resin utilized in more particularly polishing the (AF) and in maximizing boron passage through the method's steps; said (AF) being provided to a system at a supply area at the site of the nuclear reactor, said method comprising the steps of:
  (a) lowering the pH of the (AF) in the supply area to improve boric acid presence and retained passage by the (AF) by selecting a step from a group of steps consisting of passing the (AF) through a hydrogen form cation resin area, and adding an acid constituent to the (AF);
  (b) polishing the (AF) by reverse osmosis or (RO), and
  (c) dividing the (AF) into a permeate volume and a reject volume, the permeate volume having an increased concentration of boron present, a lower radioactive contaminant content, and a lower isotopic, organic and mineral content; and the reject volume having a decreased concentration of boron, an increased non-radioactive content and an increased isotopic, organic and mineral content;
  (d) recycling the reject volume to the supply area and contemporaneously adding and combining with the reject volume in the supply area further amounts of new (AF) to bring the combination to equilibrium or a steady state condition to form a recycled feedstream, and passing the recycled feedstream through, and repeating, said steps (a), (b) and (c) of the method, and upon said recycling conveying a new permeate volume to said outside ambient environment; and
  (e) conveying the permeate volume to the outside ambient environment.

46. The method of claim 45; wherein, as a part of step (d), homogeneously mixing the reject volume, when recycled to the supply area, with a new aqueous fluid volume.

47. The method of claim 45; wherein, as a part of step (d) the reject volume on recycle and a new aqueous fluid volume being supplied in relation to one another to establish equilibrium.

48. The method of claim 45; wherein the aqueous fluid volume is part of a sub-process comprising aging, settling or coagulating in the supply area.

* * * * *